United States Patent
Matsui et al.

(10) Patent No.: US 8,159,988 B2
(45) Date of Patent: Apr. 17, 2012

(54) RELAY APPARATUS, RELAY METHOD, AND RECORDING MEDIUM STORING RELAY PROGRAM

(75) Inventors: Kazuki Matsui, Kawasaki (JP); Hideto Kihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 691 days.

(21) Appl. No.: 11/853,996

(22) Filed: Sep. 12, 2007

(65) Prior Publication Data

US 2008/0062910 A1    Mar. 13, 2008

(30) Foreign Application Priority Data

Sep. 13, 2006 (JP) ................. 2006-248486

(51) Int. Cl.
*H04B 7/14* (2006.01)
*H04B 7/26* (2006.01)
*H04W 4/02* (2009.01)

(52) U.S. Cl. ............... 370/315; 370/316; 455/414.1; 455/426.1

(58) Field of Classification Search .......... 370/310, 370/315, 316; 455/426.1, 436, 445, 456.1, 455/414.1, 456.3
See application file for complete search history.

(56) References Cited

U.S. PATENT DOCUMENTS

| | | | | |
|---|---|---|---|---|
| 7,277,713 | B2 * | 10/2007 | Landschaft et al. | ........ 455/456.1 |
| 7,565,154 | B2 * | 7/2009 | Yoon | ........... 455/456.1 |
| 2001/0050631 | A1 | 12/2001 | Takenaga | |
| 2006/0148491 | A1 * | 7/2006 | Hyun et al. | ........... 455/456.1 |
| 2006/0161770 | A1 | 7/2006 | Goto et al. | |
| 2007/0077945 | A1 * | 4/2007 | Sheynblat | ........... 455/456.5 |

FOREIGN PATENT DOCUMENTS

| | | |
|---|---|---|
| JP | 200128773 A | 1/2001 |
| JP | 2001346246 A | 12/2001 |
| JP | 2005-229406 A | 8/2005 |

(Continued)

OTHER PUBLICATIONS

Partial English-language translation of JP2005-229406A (publication date Aug. 25, 2005; to supplement reference previously cited herein) Applicant: NTT DOCOMO, Inc., Inventor: Kayoko Fukusawa. Paragraphs [0023]—[0074] and [0083] and Figs. 1 and 16. (33 pages) together with Machine-translation of JP2005-229406A (English-language) obtained from Japan Patent Office via http://www4.ipdl.inpit.go.jp on Feb. 22, 2011.(20 pages).

(Continued)

*Primary Examiner* — Robert Scheibel
*Assistant Examiner* — Saba Tsegaye
(74) *Attorney, Agent, or Firm* — Fujitsu Patent Center

(57) ABSTRACT

A relay apparatus includes: a terminal position information updating part for updating position information of a wireless terminal and position information of a wired terminal stored in a terminal position information storing part, to position information of the wireless terminal and position information of the wired terminal obtained by a terminal position measuring device, based on IP addresses of the wireless terminal and the wired terminal; a terminal-to-terminal distance calculating part for calculating a distance between the wireless terminal and the wired terminal; a distance determining part for determining whether or not the calculated distance falls in a predetermined distance range represented by communication condition data stored in a communication condition data storing part; and a communication control part for controlling the communication between the wireless terminal and the wired terminal according to communication conditions represented by the communication condition data, when the calculated distance falls in the predetermined distance range.

14 Claims, 12 Drawing Sheets

FOREIGN PATENT DOCUMENTS

JP   2006-203300 A   8/2006
JP   2006-237981 A   9/2006

OTHER PUBLICATIONS

Partial English-language translation of JP2006-237981A (publication date Sep. 7, 2006; to supplement reference previously cited herein) Applicant: NEC Access Technica Ltd., Inventor: Yasutaka Nagashima. Paragraphs [0007]—[0047], [0056] and Fig. 7. (28 pages) together with Machine-translation of JP2006-237981 (English-language) obtained from Japan Patent Office via http://www4.ipdl.inpit.go.jp on Feb. 22, 2011. (3 pages).

Office Action mailed Feb. 1, 2011, by the Japan Patent Office, in connection with counterpart JP patent application 2006-248486, English-language translation provided. 6 pages total.

* cited by examiner

| | IP address | Port number | Position information |
|---|---|---|---|
| R1 | 10.254.212.195 | 80 | a, b |
| R2 | 10.254.212.196 | 8080 | c, d |
| R3 | ... | ... | ... |

240

F I G. 3

|  | Central position | Distance range | Communication bandwidth |
|---|---|---|---|
| R1 | c, d | 0~5m | 60% |
| R2 | c, d | 5~10m | 30% |
| R3 | c, d | 10~20m | 10% |

| | Central position | Distance range | Priority degree |
|---|---|---|---|
| R1 | c, d | 0~5m | 1 |
| R2 | c, d | 5~10m | 2 |
| R3 | c, d | 10~20m | 3 |

RELAY APPARATUS, RELAY METHOD, AND RECORDING MEDIUM STORING RELAY PROGRAM

BACKGROUND OF THE INVENTION

1. Field of the Invention

The present invention relates to a relay apparatus, a relay method, and a recording medium storing a relay program. More specifically, it relates to a relay apparatus for relaying communication between a wireless terminal and a terminal on the other end, a relay method for the same, and a recording medium storing a relay program for the same.

2. Description of Related Art

Recently, for example, as in an IP telephone via a wireless LAN, a mobile terminal that performs a telephone conversation via wireless communication has become widespread. The mobile terminal that performs a telephone conversation via wireless communication enables a telephone conversation with a terminal on the other end connected to a wired network by, for example, performing wireless communication with a relay apparatus (e.g., an access point of a wireless LAN, etc.) (see e.g. JP-A-2001-28773).

Further, a mobile terminal has not only a function of performing a telephone conversation, but also functions of browsing a website and transmitting/receiving an E-mail by making an access to the Internet. In particular, recently, the innovation of a mobile terminal as a terminal accessible to the Internet has been advanced rapidly, and a mobile terminal has a function as a digital camera, a function for executing application software, or a function as a global positioning system (GPS) (see e.g. JP 2001-346246 A). The mobile terminal has gone beyond the framework as a terminal used on the Internet, and now is developing into equipment having a function as a personal digital assistant (PDA). Using such a mobile terminal, various solutions have been proposed.

Here, the JP-A-2001-28773 discloses a communication system that uses an already-existing network to transmit a simple one-way message transmission at a low cost. More specifically, a wireless terminal as a transmission source accesses a relay apparatus so as to transmit communication data to the relay apparatus. The relay apparatus adds the number of the relay apparatus to the communication data transmitted from the wireless terminal so as to form the data to be transmitted. The relay apparatus transmits, to a one-way service server, the thus formed data to be transmitted. The one-way service server obtains position information of the relay apparatus from the number of the relay apparatus in the data transmitted from the relay apparatus. The one-way service server transmits the obtained position information and the transmitted data to a terminal on the other end. The terminal on the other end displays the transmitted position information and the transmitted data.

The JP-A-2001-346246 discloses a mobile terminal having a function as a GPS. More specifically, the mobile terminal has a function of obtaining position information of the terminal itself, and transmits the position information thus obtained to a terminal on the other end. The terminal on the other end obtains map data, and displays the obtained map data together with the position information thus transmitted thereto.

However, though the JP-A-2001-28773 described above discloses that a relay apparatus adds the number of the relay apparatus itself to communication data transmitted from a wireless terminal, and a one-way service server obtains position information of the relay apparatus from the number of the relay apparatus and transmits the thus obtained position information of the relay apparatus to a terminal on the other end, it does not disclose that the relay apparatus controls the communication between the wireless terminal and the terminal on the other end according to the position information of the wireless terminal.

Besides, to control a communication between a wireless terminal as a transmission source and a terminal on the other end as a transmission destination according to position information of the wireless terminal and position information of the terminal on the other end, generally, as described in the JP-A-2001-346246, it is necessary that the wireless terminal and the terminal on the other end should be provided with an additional function as a GPS so that the wireless terminal and the terminal on the other end obtain position information of themselves, and the position information thus obtained should be transmitted to the relay apparatus. In other words, the applications of the wireless terminal and the terminal on the other end have to be changed.

SUMMARY OF THE INVENTION

The present invention has been made with the foregoing problems in mind, and it is an object of the present invention to provide a relay apparatus, a relay method, and a recording medium storing a relay program, with which the control of a communication between a wireless terminal and a terminal on the other end according to position information of the wireless terminal is enabled without changing applications of the wireless terminal and the terminal on the other end.

To achieve the above-described object, a relay apparatus of the present invention is a relay apparatus for relaying a communication between a wireless terminal and a terminal on the other end, and includes: a wireless interface part that receives, from the wireless terminal, communication data including identification information of the wireless terminal as a transmission source, identification information of the terminal on the other end as a transmission destination, and contents to be transmitted; an identification information extracting part that extracts identification information of the wireless terminal and the identification information of the terminal on the other end from the received communication data; a terminal position information obtaining part that obtains position information of the wireless terminal and position information of the terminal on the other end from a terminal position measuring device that measures positions of the wireless terminal and the terminal on the other end; a terminal position information storing part that stores the identification information and the position information of the wireless terminal in an associated state, and stores the identification information and the position information of the terminal on the other end in an associated state; a terminal position information updating part that updates the position information of the wireless terminal and the position information of the terminal on the other end stored in the terminal position information storing part, to the position information of the wireless terminal and the position information of the terminal on the other end obtained by the terminal position information obtaining part, based on the identification information of the wireless terminal and the identification information of the terminal on the other end extracted by the identification information extracting part; a terminal-to-terminal distance calculating part that calculates a distance between the wireless terminal and the terminal on the other end based on the position information of the wireless terminal and the position information of the terminal on the other end stored in the terminal position information storing part; a communication condition data storing part that stores communication condition data representing a predetermined distance range and communication conditions for the predetermined distance range; a distance determining part that determines whether or not the distance between the wireless terminal and the terminal on the other end calculated by the terminal-to-terminal distance calculating part falls in the predetermined distance range represented by the communication condition data stored in the communication condition data storing part; and a communication control part that controls the communication between the wireless terminal and the terminal on the other end according to the communication conditions represented by the communication condition data stored in the communication condition data storing part, when the distance determining part determines that the calculated distance falls in the predetermined distance range.

In the relay apparatus of the present invention, the wireless interface part receives, from a wireless terminal, communication data including identification information of the wireless terminal as a transmission source, identification information of a terminal on the other end as a transmission destination, and contents to be transmitted. It should be noted that the terminal on the other end is, for example, a wired terminal connected through a wire, a wireless terminal accessible wirelessly, a terminal on the Internet, or the like. The identification information is, for example, an IP address, but it is not limited as such but can be anything as long as it is capable of identifying a terminal uniquely. The identification information extracting part extracts identification information of the wireless terminal and identification information of the terminal on the other end from the communication data. The terminal position information obtaining part obtains position information of the wireless terminal and position information of the terminal on the other end from a terminal position measuring device. It should be noted that the terminal position measuring device may be configured as a device separate from the relay apparatus, or alternatively, it may be provided integrally with the relay apparatus. The terminal position information updating part updates the position information of the wireless terminal and the position information of the terminal on the other end stored in the terminal position information storing part, to the position information of the wireless terminal and the position information of the terminal on the other end obtained by the terminal position information obtaining part, based on the identification information of the wireless terminal and the identification information of the terminal on the other end. The terminal-to-terminal distance calculating part calculates a distance between the wireless terminal and the terminal on the other end based on the position information of the wireless terminal and the position information of the terminal on the other end stored in the terminal position information storing part. The terminal-to-terminal distance calculating part calculates a distance between the wireless terminal and the terminal on the other end. The distance determining part determines whether or not the distance between the wireless terminal and the terminal on the other end falls in a predetermined distance range represented by communication condition data stored in the communication condition data storing part. The communication control part controls the communication between the wireless terminal and the terminal on the other end according to the communication conditions represented by the communication condition data stored in the communication condition data storing part, when the distance determining part determines that the calculated distance falls in the predetermined distance range.

Thus, in the case where a distance between a wireless terminal as a transmission source and a terminal on the other end as a transmission destination falls in a predetermined distance range represented by communication condition data, the relay apparatus of the present invention controls a communication between the wireless terminal and the terminal on the other end according to communication conditions represented by the communication condition data. This makes it possible to control a communication between a wireless terminal and a terminal on the other end according to position information of the wireless terminal and position information of the terminal on the other end, without changing applications of the wireless terminal and the terminal on the other end.

To achieve the above-described object, a relay apparatus of the present invention is a relay apparatus for relaying a communication between a wireless terminal and a terminal on the other end, and the relay apparatus includes: a wireless interface part that receives, from the wireless terminal, communication data including identification information of the wireless terminal as a transmission source, identification information of the terminal on the other end as a transmission destination, and contents to be transmitted; an identification information extracting part that extracts identification information of the wireless terminal from the received communication data; a terminal position information obtaining part that obtains position information of the wireless terminal from a terminal position measuring device that measures a position of the wireless terminal; a terminal position information storing part that stores the identification information and the position information of the wireless terminal in an associated state; a terminal position information updating part that updates the position information of the wireless terminal stored in the terminal position information storing part to the position information of the wireless terminal obtained by the terminal position information obtaining part, based on the identification information of the wireless terminal extracted by the identification information extracting part; a reference position information storing part that stores reference position information representing a reference position as a reference with respect to the position of the wireless terminal; a terminal-to-reference distance calculating part that calculates a distance between the wireless terminal and the reference position based on the position information of the wireless terminal stored in the terminal position information storing part and the reference position information stored in the reference position information storing part; a communication condition data storing part that stores communication condition data representing a predetermined distance range and communication conditions for the predetermined distance range; a distance determining part that determines whether or not the distance between the wireless terminal and the reference position calculated by the terminal-to-reference-position distance calculating part falls in the predetermined distance range represented by the communication condition data stored in the communication condition data storing part; and a communication control part that controls the communication between the wireless terminal and the terminal on the other end according to the communication conditions represented by the communication condition data stored in the communication condition data storing part, when the distance determining part determines that the calculated distance falls in the predetermined distance range.

In the relay apparatus of the present invention, the wireless interface part receives, from a wireless terminal, communication data including identification information of the wireless terminal as a transmission source, identification information of a terminal on the other end as a transmission destination, and contents to be transmitted. It should be noted that the terminal on the other end is, for example, a wired terminal connected through a wire, a wireless terminal accessible wirelessly, a terminal on the Internet, or the like. The identification information is, for example, an IP address, but it is not limited as such but can be anything as long as it is capable of identifying a terminal uniquely. The identification information extracting part extracts identification information of the wireless terminal from the communication data. The terminal position information obtaining part obtains position information of the wireless terminal from a terminal position measuring device. It should be noted that the terminal position measuring device may be configured as a device separate from the relay apparatus, or alternatively, it may be provided integrally with the relay apparatus. The terminal position information updating part updates the position information of the wireless terminal stored in the terminal position information storing part, to the position information of the wireless terminal obtained by the terminal position information obtaining part, based on the identification information of the wireless terminal. The terminal-to-reference distance calculating part calculates a distance between the wireless terminal and a reference position stored in the reference position information storing part. The distance determining part determines whether or not the distance between the wireless terminal and the reference position falls in a predetermined distance range represented by communication condition data stored in the communication condition data storing part. The communication control part controls the communication between the wireless terminal and the terminal on the other end according to the communication conditions represented by the communication condition data stored in the communication condition data storing part, when the distance determining part determines that the calculated distance falls in the predetermined distance range.

Thus, in the case where a distance between a wireless terminal as a transmission source and a reference position falls in a predetermined distance range represented by communication condition data, the relay apparatus of the present invention controls a communication between the wireless terminal and a terminal on the other end according to communication conditions represented by the communication condition data. This makes it possible to control a communication between a wireless terminal and a terminal on the other end according to position information of the wireless terminal, without changing applications of the wireless terminal and the terminal on the other end.

The relay apparatus of the present invention is preferably configured so that when the distance determining part determines that the calculated distance falls in the predetermined distance range, the communication control part transmits the communication data received from the wireless terminal to the terminal on the other end, and when the distance determining part determines that the calculated distance is out of the predetermined distance range, the communication control part abandons the communication data received from the wireless terminal.

With the above-described configuration, when the distance determining part determines that the calculated distance falls in the predetermined distance range, the communication control part transmits the communication data received from the wireless terminal to the terminal on the other end. On the other hand, when the distance determining part determines that the calculated distance is out of the predetermined distance range, the communication control part abandons the communication data received from the wireless terminal. This makes it possible to transmit, or abandon, the communication data received from the wireless terminal, according to the distance between the wireless terminal and either the terminal on the other end or the reference position.

The relay apparatus of the present invention is preferably configured so that when the communication control part abandons the communication data received from the wireless terminal, the communication control part generates notification data representing a transmission error, and transmits the generated notification data to the wireless terminal.

The above-described configuration allows a user of the wireless terminal to know, according to the notification data, that a transmission error has occurred with the communication data. Therefore, this allows the user of the wireless terminal to promptly retransmit the communication data by, for example, changing the location of the wireless terminal.

The relay apparatus of the present invention is preferably configured so that the communication condition data storing part stores communication condition data representing a predetermined distance range, and a communication bandwidth for the predetermined distance range, and when the distance determining part determines the calculated distance falls in the predetermined distance range, the communication control part allocates a communication bandwidth represented by the communication condition data stored in the communication condition data storing part to the communication between the wireless terminal and the terminal on the other end.

With the above-described configuration, when the distance determining part determines the calculated distance falls in the predetermined distance range, the communication control part allocates a communication bandwidth represented by the communication condition data to the communication between the wireless terminal and the terminal on the other end. This makes it possible to allocate a communication bandwidth according to the distance between the wireless terminal and either the terminal on the other end or the reference position.

The relay apparatus of the present invention is preferably configured so that the communication condition data storing part stores communication condition data representing predetermined distance ranges set at a plurality of levels and priority degrees for the predetermined distance ranges, and the communication control part relays communications in a manner such that a communication between a wireless terminal and a terminal on the other end, a distance between which falls in the predetermined distance range with a higher priority degree represented by communication condition data stored in the communication condition data storing part, is relayed by priority with respect to a communication between a wireless terminal and a terminal on the other end, a distance between which falls in the predetermined distance range with a lower priority degree represented by communication condition data stored in the communication condition data storing part.

With the above-described configuration, the communication control part relays communications so that a communication between a wireless terminal and a terminal on the other end, a distance between which falls in the predetermined distance range with a higher priority degree, is relayed by priority with respect to a communication between a wireless terminal and a terminal on the other end, a distance between which falls in the predetermined distance range with a lower priority degree. This makes it possible to relay by priority a communication between a wireless terminal and a terminal on the other end, a distance between which falls in a predetermined distance range with a higher priority, according to the distance between the wireless terminal and either the terminal on the other end or the reference position.

The relay apparatus of the present invention is preferably configured so that when the distance determining part determines that the calculated distance falls in the predetermined distance range, the communication control part adds position information of the wireless terminal stored in the terminal position information storing part to the communication data received from the wireless terminal.

According to the above-described configuration, the communication control part adds position information of the wireless terminal to the communication data received from the wireless terminal. With this configuration, when the terminal on the other end receives communication data to which the position information of the wireless terminal is added, the terminal on the other end is allowed to perform various processing operations according to the position information added to the communication data.

To achieve the above-described object of the present invention, a relay method of the present invention is a relay method for relaying a communication between a wireless terminal and a terminal on the other end, which is performed by a relay apparatus that includes: a terminal position information storing part that stores identification information and position information of the wireless terminal in an associated state and stores identification information and position information of the terminal on the other end in an associated state; and a communication condition data storing part that stores communication condition data representing a predetermined distance range and communication conditions for the predetermined distance range. The method includes: an operation of receiving, from the wireless terminal, communication data including identification information of the wireless terminal as a transmission source, identification information of the terminal on the other end as a transmission destination, and contents to be transmitted; an identification information extracting operation of extracting the identification information of the wireless terminal and the identification information of the terminal on the other end from the received communication data; a terminal position information obtaining operation of obtaining position information of the wireless terminal and position information of the terminal on the other end from a terminal position measuring device that measures positions of the wireless terminal and the terminal on the other end; a terminal position information updating operation of updating the position information of the wireless terminal and the position information of the terminal on the other end stored in the terminal position information storing part, to the position information of the wireless terminal and the position information of the terminal on the other end obtained in the terminal position information obtaining operation, based on the identification information of the wireless terminal and the identification information of the terminal on the other end extracted in the identification information extracting operation; a terminal-to-terminal distance calculating operation of calculating a distance between the wireless terminal and the terminal on the other end based on the position information of the wireless terminal and the position information of the terminal on the other end stored in the terminal position information storing part; a distance determining operation of determining whether or not the distance between the wireless terminal and the terminal on the other end calculated in the terminal-to-terminal distance calculating operation falls in the predetermined distance range represented by the communication condition data stored in the communication condition data storing part; and a communication control operation of controlling the communication between the wireless terminal and the terminal on the other end according to the communication conditions represented by the communication condition data stored in the communication condition data storing part, when it is determined in the distance determining operation that the calculated distance falls in the predetermined distance range.

To achieve the above-described object, a relay method of the present invention is a method for relaying a communication between a wireless terminal and a terminal on the other end, which is performed by a relay apparatus that includes: a terminal position information storing part that stores identification information and position information of the wireless terminal in an associated state; a reference position information storing part that stores reference position information representing a reference position as a reference with respect to the position of the wireless terminal; and a communication condition data storing part that stores communication condition data representing a predetermined distance range and communication conditions for the predetermined distance range. The method includes: an operation of receiving, from the wireless terminal, communication data including identification information of the wireless terminal as a transmission source, identification information of the terminal on the other end as a transmission destination, and contents to be transmitted; an identification information extracting operation of extracting the identification information of the wireless terminal from the received communication data; a terminal position information obtaining operation of obtaining position information of the wireless terminal from a terminal position measuring device that measures a position of the wireless terminal; a terminal position information updating operation of updating the position information of the wireless terminal stored in the terminal position information storing part to the position information of the wireless terminal obtained in the terminal position information obtaining operation, based on the identification information of the wireless terminal extracted in the identification information extracting operation; a terminal-to-reference distance calculating operation of calculating a distance between the wireless terminal and the reference position based on the position information of the wireless terminal stored in the terminal position information storing part and the reference position information stored in the reference position information storing part; a distance determining operation of determining whether or not the distance between the wireless terminal and the reference position calculated in the terminal-to-reference distance calculating operation falls in the predetermined distance range represented by the communication condition data stored in the communication condition data storing part; and a communication control operation of controlling the communication between the wireless terminal and the terminal on the other end according to the communication conditions represented by the communication condition data stored in the communication condition data storing part, when it is determined in the distance determining operation that the calculated distance falls in the predetermined distance range.

To achieve the above-described object of the present invention, a recording medium of the present invention stores a relay program for causing a computer to execute processing of relaying a communication between a wireless terminal and a terminal on the other end, the computer including: a terminal position information storing part that stores identification information and position information of the wireless terminal in an associated state and stores identification information and position information of the terminal on the other end in an associated state; and a communication condition data storing part that stores communication condition data representing a predetermined distance range and communication conditions for the predetermined distance range. The relay program causes the computer to execute: reception processing of receiving, from the wireless terminal, communication data including identification information of the wireless terminal as a transmission source, identification information of the terminal on the other end as a transmission destination, and contents to be transmitted; identification information extraction processing of extracting the identification information of the wireless terminal and the identification information of the terminal on the other end from the received communication data; terminal position information obtainment processing of obtaining position information of the wireless terminal and position information of the terminal on the other end from a terminal position measuring device that measures positions of the wireless terminal and the terminal on the other end; terminal position information updating processing of updating the position information of the wireless terminal and the position information of the terminal on the other end stored in the terminal position information storing part, to the position information of the wireless terminal and the position information of the terminal on the other end obtained in the terminal position information obtainment processing, based on the identification information of the wireless terminal and the identification information of the terminal on the other end extracted in the identification information extraction processing; terminal-to-terminal distance calculation processing of calculating a distance between the wireless terminal and the terminal on the other end based on the position information of the wireless terminal and the position information of the terminal on the other end stored in the terminal position information storing part; distance determination processing of determining whether or not the distance between the wireless terminal and the terminal on the other end calculated in the terminal-to-terminal distance calculation processing falls in the predetermined distance range represented by the communication condition data stored in the communication condition data storing part; and communication control processing of controlling the communication between the wireless terminal and the terminal on the other end according to the communication conditions represented by the communication condition data stored in the communication condition data storing part, when it is determined in the distance determination processing that the calculated distance falls in the predetermined distance range.

To achieve the above-described object of the present invention, a recording medium of the present invention stores a relay program for causing a computer to execute processing of relaying a communication between a wireless terminal and a terminal on the other end, the computer including: a terminal position information storing part that stores identification information and position information of the wireless terminal in an associated state; a reference position information storing part that stores reference position information representing a reference position as a reference with respect to the position of the wireless terminal; and a communication condition data storing part that stores communication condition data representing a predetermined distance range and communication conditions for the predetermined distance range. The relay program causes the computer to execute: reception processing of receiving, from the wireless terminal, communication data including identification information of the wireless terminal as a transmission source, identification information of the terminal on the other end as a transmission destination, and contents to be transmitted; identification information extraction processing of extracting the identification information of the wireless terminal from the received communication data; terminal position information obtainment processing of obtaining position information of the wireless terminal from a terminal position measuring device that measures a position of the wireless terminal; terminal position information updating processing of updating the position information of the wireless terminal stored in the terminal position information storing part to the position information of the wireless terminal obtained in the terminal position information obtainment processing, based on the identification information of the wireless terminal extracted in the identification information extraction processing; terminal-to-reference distance calculation processing of calculating a distance between the wireless terminal and the reference position based on the position information of the wireless terminal stored in the terminal position information storing part and the reference position information stored in the reference position information storing part; distance determination processing of determining whether or not the distance between the wireless terminal and the reference position calculated in the terminal-to-reference distance calculation processing falls in the predetermined distance range represented by the communication condition data stored in the communication condition data storing part; and communication control processing of controlling the communication between the wireless terminal and the terminal on the other end according to the communication conditions represented by the communication condition data stored in the communication condition data storing part, when it is determined in the distance determination processing that the calculated distance falls in the predetermined distance range.

It should be noted that the relay method of the present invention and the recording medium storing the relay program according to the present invention achieve the same effects as those of the relay apparatus described above.

BRIEF DESCRIPTION OF THE DRAWINGS

FIG. 3 shows an exemplary data structure of a terminal position information storing part in the AP.

FIG. 7 shows a first modification example of the data structure of the communication condition data storing part.

FIG. 8 shows a second modification example of the data structure of the communication condition data storing part.

DETAILED DESCRIPTION OF THE INVENTION

Figure 1:
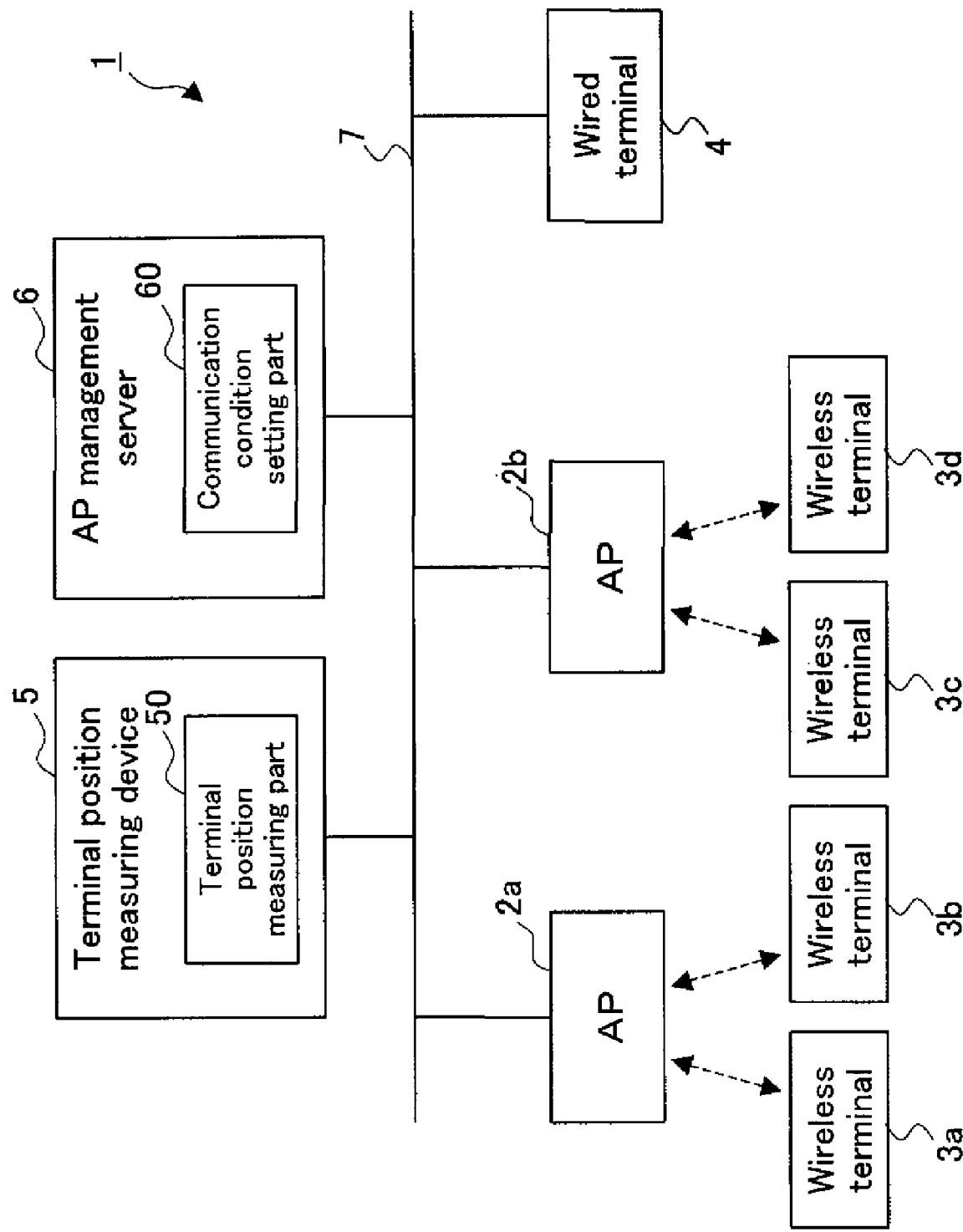
FIG. 1 is a block diagram showing a schematic configuration of a communication system according to Embodiment 1 of the present invention.

The inventors of the present invention focused attention on that communication data are transmitted/received via a relay apparatus on a network such as an access point (AP) on a wireless local area network (LAN), and particularly that at each access point in the wireless LAN, a terminal in a state of being communicable with the access point, and the position information of the terminal are managed.

In other words, by extracting information specifying a terminal as a transmission source or information specifying a terminal as a transmission destination, contained in communication data transmitted by the terminal as the transmission source, when the communication data pass a relay apparatus on a network, it is possible to obtain position information of the specified terminal according to the thus extracted information that specifies the terminal as the transmission source or the terminal as the transmission destination. Further, with preliminarily setting in a relay apparatus of position information as a reference for determination of communicability or a communication permission range starting from the position information as a reference, the determination regarding whether or not transmission and/or reception of communication data should be authorized is enabled by comparing the thus obtained position information of the terminal with the communication permission range starting from the position information as a reference. This enables the control of communication data without changing the already-existing application or the like.

For example, in an information distribution service for distributing information according to the position of a terminal device, conventionally a system has been required in which position information is notified from a terminal device to an information distributing server and the information distributing server also obtains position information from the terminal device, so that information according to the position information is distributed. In the present invention, however, a communication permission range starting from position information as a reference is set in an access point. This makes it possible to control the communication of communication data passing the access point, that is, to determine whether the communication data should be further transmitted to a network or abandoned. Therefore, it is possible to distribute information exclusively to a range that has been set as a destination of distribution of the information.

The following will describe more specific embodiments of the present invention while referring to the drawings.

Embodiment 1

FIG. 1 is a block diagram showing a schematic configuration of a communication system 1 according to the present embodiment. In other words, the communication system 1 according to the present embodiment includes wireless LAN access points (hereinafter abbreviated as AP) 2a and 2b, wireless terminals 3a to 3d, a wired terminal 4, a terminal position measuring device 5, and an AP management server 6.

The APs 2a and 2b, the wired terminal 4, the terminal position measuring device 5, and the AP management server 6 are connected with one another through a wire via a wired LAN 7. The wireless terminals 3a to 3d are accessible wirelessly to the APs 2a and 2b. FIG. 1 shows, as an example, a state in which the wireless terminals 3a and 3b are accessible to the AP 2a, and the wireless terminals 3c and 3d are accessible to the AP 2b. In this state, the AP 2a relays communication between the wireless terminals 3a, 3b and the wired LAN 7, while the AP 2b relays communication between the wireless terminals 3c, 3d and the wired LAN 7. It should be noted that FIG. 1, for simplification of description, shows only four wireless terminals 3a to 3d, two APs 2a and 2b, and one wired terminal 4, but arbitrary numbers of APs, wireless terminals, and wired terminals can be provided to compose the communication system 1. Besides, a session initiation protocol (SIP) server, for example, may be provided on the communication system 1.

(Configuration of Communication System)

The following will briefly describe an overall configuration of the communication system 1 before describing a detailed configuration of an AP.

The wireless terminals 3a to 3d communicate with one another or the wired terminal 4 via the AP 2a, 2b or the wired LAN 7. The wireless terminals 3a to 3d are, for example, though not limited to, mobile terminals such as Internet protocol (IP) telephones. Examples of the wireless terminals 3a to 3d include a personal handy-phone system (PHS), a personal digital assistant (PDA), a car navigation system, a video reproducing terminal, an electronic organizer, a game machine, and a GPS terminal.

The wireless terminals 3a to 3d transmit communication data to the AP 2a or 2b. The communication data contain an IP address of one of the wireless terminals 3a to 3d as a transmission source, an IP address of another wireless terminal or the wired terminal 4 on the other end as a transmission destination, and contents to be transmitted. The communication data also contain an IP address of the AP 2a or 2b accessible from the wireless terminals 3a to 3d. Examples of the communication data include data representing telephone conversation contents, moving picture data, still picture data, audio data, text data, and control data instructing a printing operation or the like. It should be noted that the communication data transmitted from the wireless terminals 3a to 3d may be encoded by, for example, the Wired Equivalent Privacy (WEP), and the encoded communication data may be decoded by the AP 2a or 2b.

The wired terminal 4 communicates with the wireless terminals 3a to 3d via the AP 2a or 2b and the wired LAN. The wired terminal 4 is a terminal device such as a telephone set, a personal computer, a workstation, or a printer.

The terminal position measuring device 5 measures positions of the wireless terminals 3a to 3d and the wired terminal 4. For this purpose, the terminal position measuring device 5 includes a terminal position measuring part 50. The terminal position measuring part 50 measures positions of the wireless terminals 3a to 3d and the wired terminal 4 by, for example, using the trilateration method by the AP. More specifically, for example, the AP utilizes a beacon signal that is transmitted from the AP at all times, to detect a response signal of the wireless terminals 3a to 3d or the wired terminal 4 in response to the beacon signal. The AP measures a radio wave intensity of the response signal. The terminal position measuring part 50 obtains radio wave intensities of the response signals from at least three APs, and using the trilateration method, obtains position information of the wireless terminals 3a to 3d and the wired terminal 4. It should be noted that the obtainment of the position information of the wireless terminals 3a to 3d and the wired terminal 4 by the terminal position measuring part 50 is not limited to that in which the trilateration method is used. For example, GPS receivers may be installed in the wireless terminals 3a to 3d or the wired terminal 4, and position information of the wireless terminals 3a to 3d and the wired terminal 4 may be obtained by the terminal position measuring part 50. In other words, the method for obtaining position information of the wireless terminals 3a to 3d and the wired terminal 4 is not limited particularly as long as the position information of the same can be obtained by the terminal position measuring part 50.

The AP management server 6 generates communication condition data representing a central position, a predetermined distance range, communication conditions for the predetermined distance range. Therefore, the AP management server 6 includes a communication condition setting part 60. The communication condition setting part 60 allows a server manager to set a central position, a range of a predetermined distance from the central position, and communication conditions for the predetermined distance range. The AP management server 6 generates communication condition data based on contents set by the communication condition setting part 60. The AP management server 6 transmits the generated communication condition data to the AP 2a or 2b. It should be noted that data representing the site where the AP 2a or 2b is placed, the usage state of the communication bandwidth, etc. may be stored in the AP management server 6. The details of the communication condition data will be described later.

The AP management server 6 is composed of one or a plurality of computers such as server machines, personal computers, and workstations. Alternatively, the AP management server 6 may be implemented by installing a program in an arbitrary computer such as a personal computer. In other words, the above-described communication condition setting part 60 can be implemented by a CPU of a computer that operates according to a program for implementing the function of the communication condition setting part 60. The AP management server 6 may be formed on one computer, or may be formed in a state of being distributed to a plurality of computers connected with the wired LAN 7.

(Configuration of AP)

Figure 2:
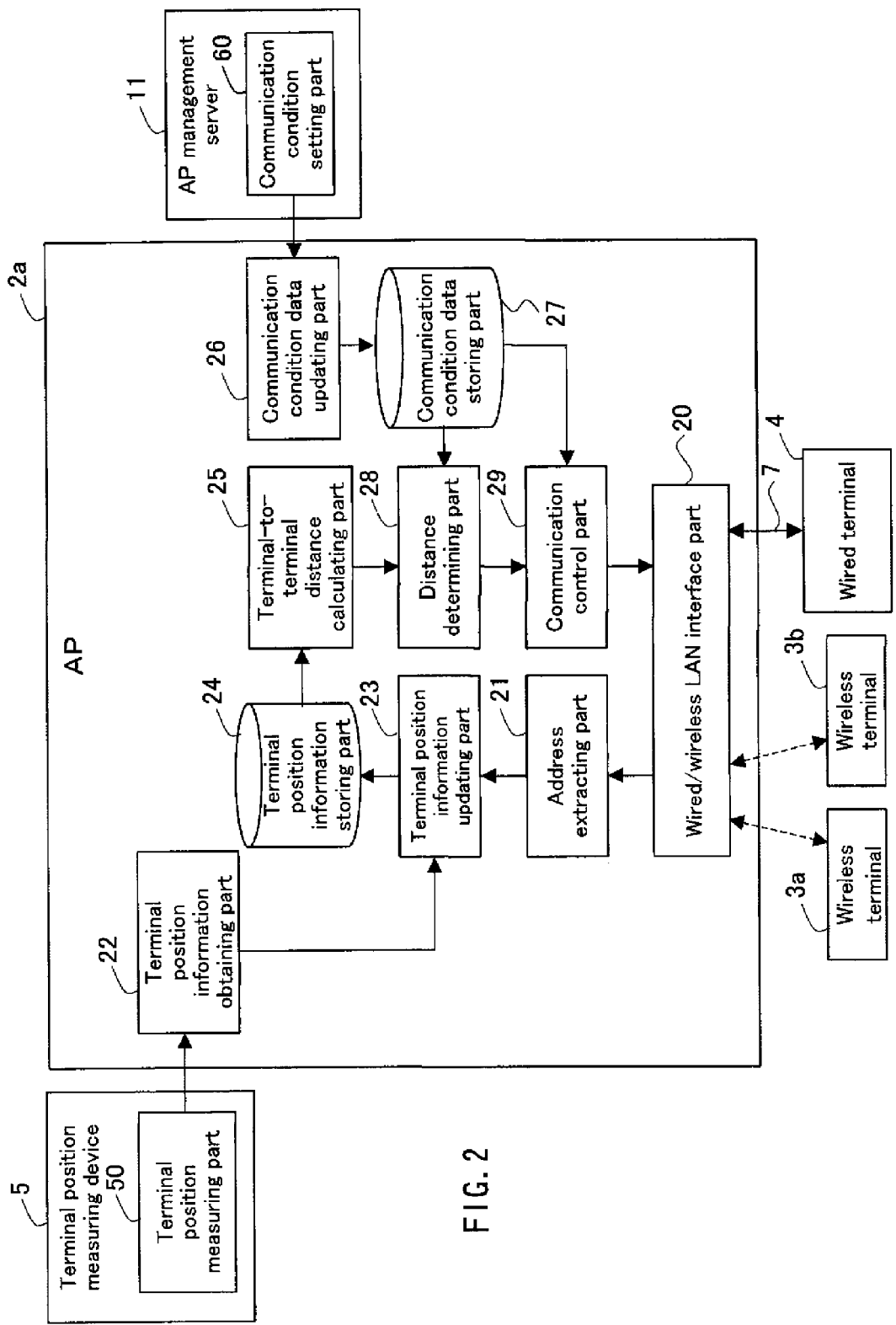
FIG. 2 is a block diagram showing a detailed configuration of an AP in the communication system.

FIG. 2 is a block diagram illustrating a detailed configuration of the AP 2a. The configuration of the AP 2b is identical to that of the AP 2a shown in FIG. 2. The AP (relay apparatus) 2a includes a wired/wireless LAN interface part 20, an address extracting part 21, a terminal position information obtaining part 22, a terminal position information updating part 23, a terminal position information storing part 24, a terminal-to-terminal distance calculating part 25, a communication condition data updating part 26, a communication condition data storing part 27, a distance determining part 28, and a communication control part 29. It should be noted that the AP 2a has a function of the Carrier Sense Multiple Access with Collision Avoidance (CSMA/CA).

The present embodiment is described by referring to, as an example, the case where the AP 2a relays a communication between the wireless terminal 3a and the wired terminal (terminal on the other end) 4, receiving communication data destined to the wired terminal 4 from the wireless terminal 3a.

The wired/wireless LAN interface part (wireless interface part, communication control part) 20 mediates the exchange of data between the AP 2a and the wired LAN 7 in conformity with the specification of the wired LAN. The wired/wireless LAN interface part 20 mediates the wireless exchange of communication data between the AP 2a and the wireless terminal 3a in conformity with the specification of the wireless LAN. In other words, the communication between the wireless terminal 3a and the wired LAN 7 is relayed by the wired/wireless LAN interface part 20. In the present embodiment, the wired/wireless LAN interface part 20 receives communication data from the wireless terminal 3a, and feeds the received communication data to the address extraction part 21. Further, when receiving the communication data from the wireless terminal 3a correctly, the wired/wireless LAN interface part 20 returns an acknowledge response signal (ACK) to the wireless terminal 3a.

The address extracting part (identification information extracting part) 21 extracts an IP address of the wireless terminal 3a as a transmission source and an IP address of the wired terminal 4 as a transmission destination from the communication data fed from the wired/wireless LAN interface part 20. It should be noted that if the wireless terminal 3a or the wired terminal 4 is identified uniquely, a media access control (MAC) address may be extracted from communication data.

The terminal position information obtaining part 22 obtains position information of the wireless terminal 3a and the position information of the wired terminal 4 from the terminal position measuring part 50 of the terminal position measuring device 5. The terminal position information obtaining part 22 feeds the position information of the wireless terminal 3a and the position information of the wired terminal 4, which are thus obtained, to the terminal position information updating part 23. The terminal position information obtaining part 22 may regularly obtain the position information of the wireless terminal 3a and the position information of the wired terminal 4, or alternatively, for example, the timings for obtaining the foregoing information may be set according to the IP address of the wireless terminal 3a and the IP address of the wired terminal 4 that the address extracting part 21 has extracted. It should be noted that preferably the terminal position information obtaining part 22 obtains the position information of the wireless terminal 3a and the position information of the wired terminal 4 from the terminal position measuring part 50 in real time. This makes it possible to obtain the latest position information even if the wireless terminal 3a and the wired terminal 4 have moved.

The terminal position information updating part 23 updates the position information of the wireless terminal 3a and the position information of the wired terminal 4 stored in the terminal position information storing part 24, to the position information of the wireless terminal 3a and the position information of the wired terminal 4 that have been obtained by the terminal position information obtaining part 22, according to the IP address of the wireless terminal 3a and the IP address of the wired terminal 4 extracted by the address extracting part 21.

The terminal position information storing part 24 is composed of, for example, a random access memory (RAM), so as to store the position information of the wireless terminal 3 and the position information of the wired terminal 4. The terminal position information storing part 24 stores the position information of the wireless terminal 3a and the position information of the wired terminal 4, for example, in a terminal position management table 240 as shown in FIG. 3. The IP address, the port number, and the position information are stored in the terminal position management table 240, in a state of being associated with each other regarding each terminal. In the example shown in FIG. 3, the IP address "10.254.212.195" of the wireless terminal 3a, the port number "80" of the wireless terminal 3a, and the position information "a, b" of the wireless terminal 3a are stored in the first row R1 of the terminal position management table 240. In the second raw R2 thereof the IP address "10.254.212.196" of the wired terminal 4, the port number "8080" of the wired terminal 4, and the position information "c, d" of the wired terminal 4 are stored. It should be noted that the position information stored in the terminal position management table 240 may be a physical absolute coordinate, or alternatively a relative coordinate. For example, with the AP 2a being assumed to be the point of origin (0, 0), the position information is a physical distance (e.g. 0.0 m to 10.0 m) from the point of origin in the case where it is an absolute coordinate, whereas the position information is a relative distance (e.g. 0.0 to 1.0) from the point of origin in the case where it is a relative coordinate. Alternatively, the position information may be latitude information and longitude information.

The terminal-to-terminal distance calculating part 25 calculates a distance between the wireless terminal 3a and the wired terminal 4 based on the position information of the wireless terminal 3a and the position information of the wired terminal 4 stored in the terminal position information storing part 24. More specifically, the terminal-to-terminal distance calculating part 25 reads the position information "a, b" of the wireless terminal 3a out of the terminal position information storing part 24 based on the IP address "10.254.212.195" of the wireless terminal 3a. The terminal-to-terminal distance calculating part 25 reads the position information "c, d" of the wired terminal 4 out of the terminal position information storing part 24 based on the IP address "10.254.212.196" of the wired terminal 4. The terminal-to-terminal distance calculating part 25 calculates a distance between the wireless terminal 3a and the wired terminal 4 based on the position information "a, b" of the wireless terminal 3a and the position information "c, d" of the wired terminal 4. For example, "a-c, b-d" is calculated as a distance between the wireless terminal 3a and the wired terminal 4.

The communication condition data updating part 26 updates communication condition data stored in the communication condition data storing part 27 to the communication condition data received from the AP management server 6. In the case where no communication condition data are stored in the communication condition data storing part 27, the communication condition data updating part 26 newly writes the communication condition data received from the AP management server 6 in the communication condition data storing part 27.

Figure 4:
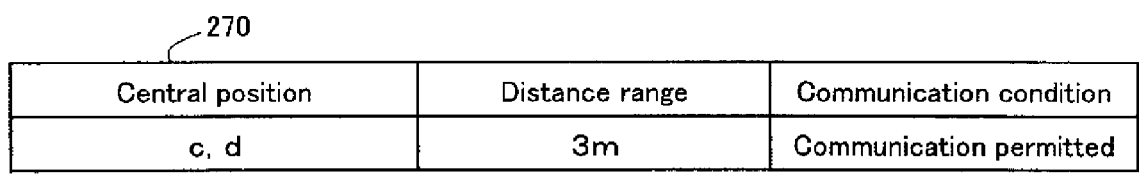
FIG. 4 shows an exemplary data structure of a communication condition data storing part in the AP.

The communication condition data storing part 27 stores communication condition data representing a central position, a predetermined distance range with respect to the central position, and communication conditions for the foregoing predetermined distance range. For example, the communication condition data storing part 27 stores the communication condition data in the form of a communication condition table 270, as shown in FIG. 4. In the communication condition table 270, the central position, a predetermined distance range with respect to the central position, and communication conditions for the foregoing predetermined distance range are stored. In the example shown in FIG. 4, the central position "c, d", the distance range "3 m", and the communication condition "communication permitted" are stored in the communication condition table 270. In other words, the communication condition table 270 shown in FIG. 4 shows that in the case where the position "c, d" of the wired terminal 4 is assumed to be the central position "c, d" and the distance between the wireless terminal 3a and the wired terminal 4 is not more than 3 m, the communication data received from the wireless terminal 3a are to be transmitted (Communication permitted) to the wired terminal 4.

The distance determining part 28 determines whether or not the distance between the wireless terminal 3a and the wired terminal 4 calculated by the terminal-to-terminal distance calculating part 25 falls in the distance range represented by the communication condition data stored in the communication condition data storing part 27. More specifically, the distance determining part 28 determines whether or not the distance "a-c, b-d" between the wireless terminal 3a and the wired terminal 4 falls in the distance range "3 m" represented by the communication condition data stored in the communication condition data storing part 27. The result of the determination by the distance determining part 28 is fed to the communication control part 29.

When the distance determining part 28 determines that the distance falls in the foregoing distance range, the communication control part 29 controls the communication between the wireless terminal 3a and the wired terminal 4 according to the communication conditions represented by the communication condition data stored in the communication condition data storing part 27. More specifically, when the distance determining part 28 determines that the distance "a-c, b-d" between the wireless terminal 3a and the wired terminal 4 falls in the distance range "3 m" represented by the communication condition data, the communication control part 29 feeds the communication data received from the wireless terminal 3a to the wired/wireless LAN interface part 20, so that the communication data are to be transmitted to the wired terminal 4. The wired/wireless LAN interface part 20 transmits the communication data to the wired terminal 4.

Here, it is preferable that the communication control part 29 is configured so that the position information of the wireless terminal 3a stored in the terminal position information storing part 24 is added to the communication data received from the wireless terminal 3a. This configuration makes it possible that when the wired terminal 4 receives the communication data to which the position information of the wireless terminal 3a is added, the wired terminal 4 should perform various operations according to the position information added to the communication data.

As an example, it is assumed that the wired terminal 4a is a printer, and the printer receives communication data containing control data instructing a printing operation, text data to be printed, and position information of the wireless terminal from each of the wireless terminals 3a and 3b in accordance with the line printer daemon protocol (LPR protocol). For example, the printer is allowed to execute by priority the instruction for the printing operation transmitted from the wireless terminal positioned closest to the printer, according to the position information of the wireless terminals 3a and 3b added to the communication data. Alternatively, the printer is allowed to print exclusively the data transmitted from a wireless terminal present in the predetermined range from the printer.

As another example, the position of the wireless terminal 3a can be displayed by the wired terminal 4 based on the position information of the wireless terminal 3a added to the communication data. This makes it possible that the position of the wireless terminal 3a can be grasped by using the wired terminal 4. Alternatively, in the case where the wired terminal 4 is an accounting server, the wired terminal 4 can perform an accounting operation for a communication charge, etc., based on the position information of the wireless terminal 3a added to the communication data. This makes it possible to, for example, set communication charges so that the charge for a communication from the wireless terminal 3a at a position farther with respect to the wired terminal 4 is set higher, while the charge for a communication from the wireless terminal 3 at a position closer to the wired terminal 4 is lower.

Figure 5:
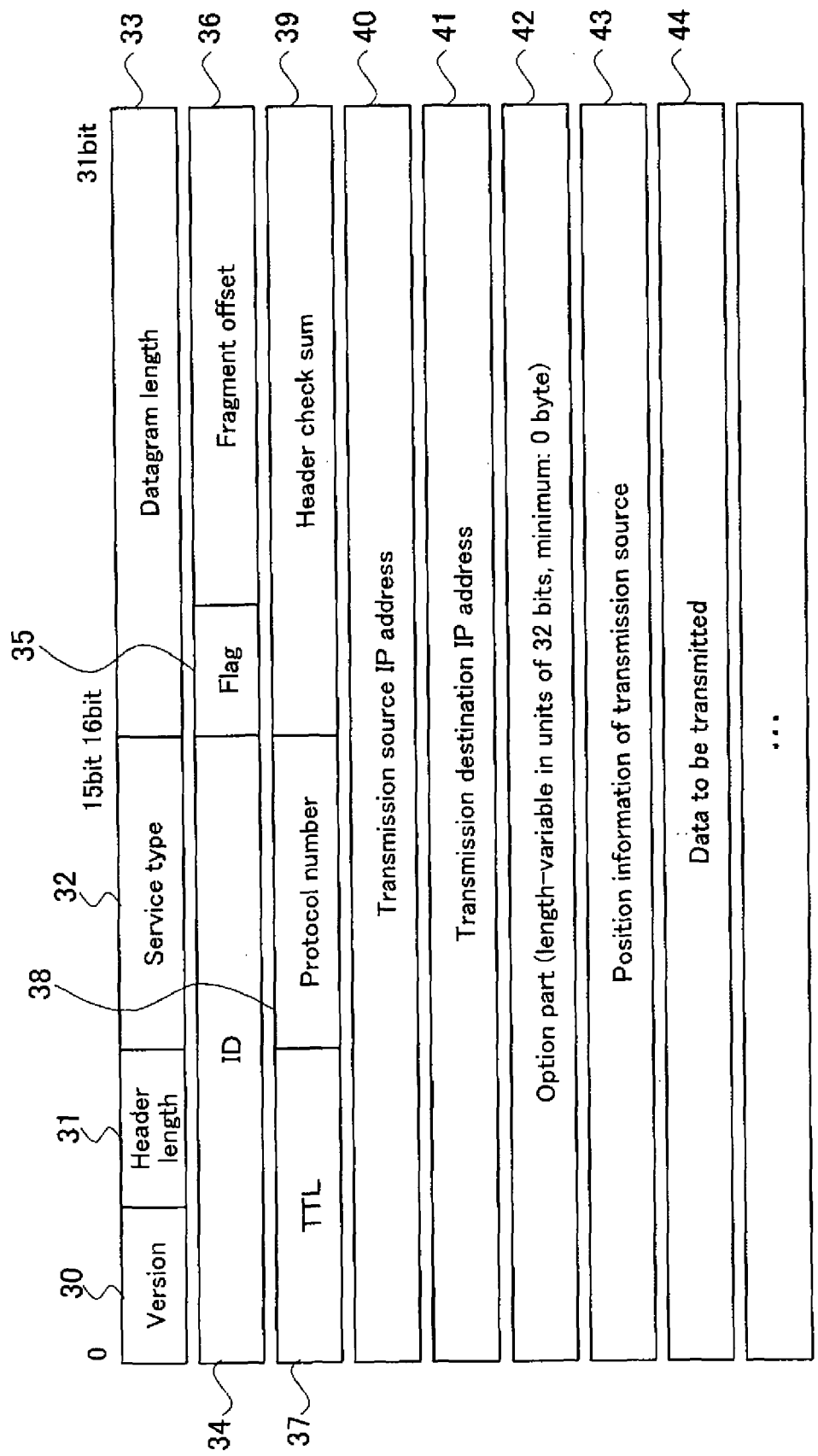
FIG. 5 shows an exemplary data structure of communication data to which position information of a wireless terminal is added by a communication control part in the AP.

FIG. 5 illustrates an exemplary data structure of communication data to which position information 43 of the wireless terminal 3a is added by the communication control part 29. As shown in FIG. 5, the communication data (IP packet) contain a version 30, a header length 31, a service type 32, a datagram length 33, an identification (ID) 34, a flag 35, a fragment offset 36, a time to live (TTL) 37, a protocol number 38, a header check sum 39, a transmission source IP address 40, a transmission destination IP address 41, an option part 42, transmission source position information 43, and transmission data 44. The version 30 is a field that represents a format of the IP packet, which is either IPv4 or IPv6. The header length 31 is a field that represents a length of a header. The service type 32 is a field that represents a characteristic of a service that requests the IP packet. The datagram length 33 is a field that represents a data length of the IP packet. The ID 34 is a field for identification of the IP packet. The flag 35 and the fragment offset 36 are fields for control of the fragmentation of the IP packet. The TTL 37 is a field that represents a maximum period in which the IP packet is alive. The protocol number 38 is a field that represents the higher-order protocol to which the data of the IP packet to be transmitted should be transferred. The header check sum 39 is a field for detecting an error in the header. The transmission source IP address 40 and the transmission destination IP address 41 are fields that represent IP addresses of the transmission source and the transmission destination. The option part 42 is a field for designating an option. The transmission source position information 43 is a field that represents position information of a terminal as the transmission source. The transmission data 44 is a field that represents contents to be transmitted.

When the distance determining part 28 determines that the position is out of the foregoing distance range, the communication control part 29 abandons communication data received from the wireless terminal 3a. It should be noted that preferably the communication control part 29 is configured so that when the communication data received from the wireless terminal 3a are abandoned, communication data representing a transmission error is generated. This configuration allows the wired/wireless IAN interface part 20 to transmit the communication data generated by the communication control part 20 to the wireless terminal 3a as the transmission source. Accordingly, the user of the wireless terminal 3a is allowed to know the transmission error for the communication data. As a result, the user of the wireless terminal 3a is allowed to perform retransmission of the communication data or the like without delay by moving the position of the wireless terminal 3a or the like.

It should be noted that the AP 2a can be implemented, alternatively, by installing a program in a certain computer such as a personal computer. In other words, the wired/wireless LAN interface part 20, the address extracting part 21, the terminal position information obtaining part 22, the terminal position information updating part 23, the terminal-to-terminal distance calculating part 25, the communication condition data updating part 26, the distance determining part 28, and the communication control part 29, which are described above, can be implemented by a CPU of a computer that operates according to a program that implements the functions of these. Therefore, a program for implementing functions of the wired/wireless LAN interface part 20, the address extracting part 21, the terminal position information obtaining part 22, the terminal position information updating part 23, the terminal-to-terminal distance calculating part 25, the communication condition data updating part 26, the distance determining part 28, and the communication control part 29, as well as a recording medium that records the foregoing program are also embodiments of the present invention. Further, the terminal position information storing part 24 and the communication condition data storing part 27 are implemented by a storage device installed in a computer, or a storage device accessible from the computer.

(Exemplary Operation of Communication System)

Figure 6:
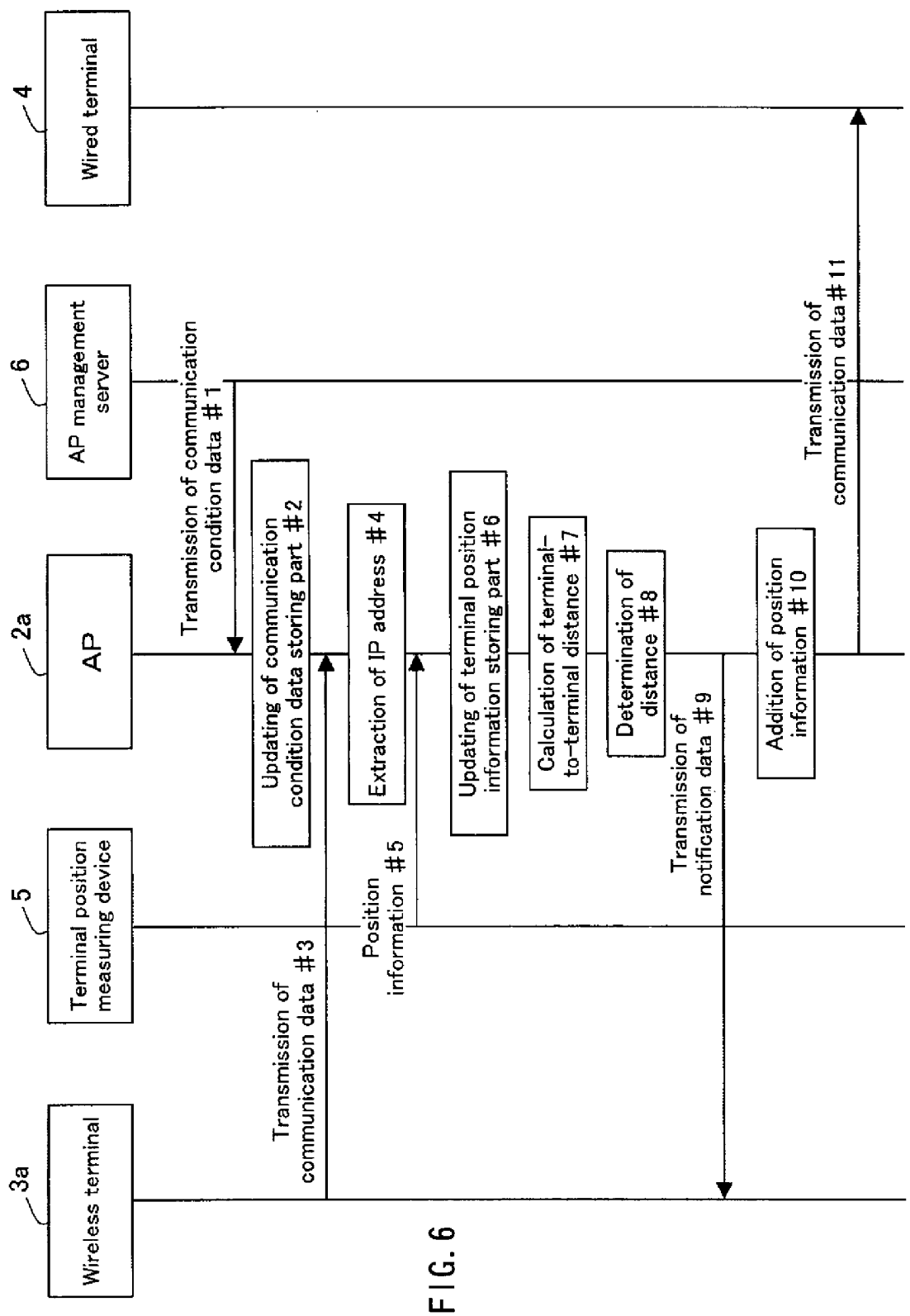
FIG. 6 is a sequence diagram showing an exemplary operation of the communication system.

An operation of the communication system 1 in the above-described configuration will be generally described with reference to FIG. 6. FIG. 6 is a sequence diagram showing an exemplary operation of the communication system 1 in the case where a communication by the wireless terminal 3a shown in FIG. 1 is performed.

The communication condition setting part 60 of the AP management server 6 allows a server manager to set a central position, a predetermined distance range, and the communication conditions for the predetermined distance range. The AP management server 6 generates the communication condition data based on the contents set by the communication condition setting part 60. The AP management server 6 transmits the generated communication condition data to the AP 2a (#1). The communication condition data updating part 26 of the AP 2a updates the communication condition data stored in the communication condition data storing part 27 of the AP 2a to the communication condition data received from the AP management server 6 (#2).

Thereafter, when the wireless terminal 3a is activated in the communication area of the AP 2a, the wireless terminal 3a transmits a search message for looking for an AP. The AP 2a responds to the search message, and this causes the wireless terminal 3a to recognize the AP 2a as an accessible AP. Then, the wireless terminal 3a transmits, to the AP 2a, the IP address of the wireless terminal 3a as the transmission source, the IP address of the wired terminal 4 as the transmission destination, and communication data that represent contents to be transmitted (#3). When the wired/wireless LAN interface part 20 of the AP 2a receives the communication data, the address extracting part 21 of the AP 2a extracts the IP address of the wireless terminal 3a as the source destination and the IP address of the wired terminal 4 as the transmission destination from the communication data (#4).

The terminal position information obtaining part 22 of the AP 2a obtains the position information of the wireless terminal 3a and the position information of the wired terminal 4 from the terminal position measuring part 50 of the terminal position measuring device 5 (#5). When the position information of the wireless terminal 3a and the position information of the wired terminal 4 are obtained, the terminal position information updating part 23 of the AP 2a updates the position information of the wireless terminal 3a and the position information of the wired terminal 4 stored in the terminal position information storing part 24 (#6). More specifically, the terminal position information updating part 23 updates the position information of the wireless terminal 3a and the position information of the wired terminal 4 stored in the terminal position information storing part 24, to the position information of the wireless terminal 3a and the position information of the wired terminal 4 obtained by the terminal position information obtaining part 22, according to the IP address of the wireless terminal 3a and the IP address of the wired terminal 4 extracted by the address extracting part 21.

Then, the terminal-to-terminal distance calculating part 25 of the AP 2a calculates a distance between the wireless terminal 3a and the wired terminal 4 based on the position information of the wireless terminal 3a and the position information of the wired terminal 4 stored in the terminal position information storing part 24 (#7). The distance determining part 28 of the AP 2a determines whether or not the distance between the wireless terminal 3a and the wired terminal 4 calculated by the terminal-to-terminal distance calculating part 25 falls in the distance range represented by the communication condition data stored in the communication condition data storing part 27 (#8)

When the distance determining part 28 determines that the foregoing distance is out of the distance range, the communication control part 29 of the AP 2a abandons the communication data received from the wireless terminal 3a. When abandoning the communication data received from the wireless terminal 3a, the communication control part 29 generates notification data representing a transmission error. The wired/wireless LAN interface part 20 transmits the communication notification data generated by the communication control part 29 to the wireless terminal 3a as the transmission source (#9).

When the distance determining part 28 determines that the foregoing distance falls in the distance range, the communication control part 29 adds position information of the wireless terminal 3a stored in the terminal position information storing part 24 to the communication data received from the wireless terminal 3a (#10). The wired/wireless LAN interface part 20 of the AP 2a transmits, to the wired terminal 4, the communication data to which the position information of the wireless terminal 3a has been added (#11).

It should be noted that the addition of position information to communication data is not indispensable. In the case where position information is added to communication data, it is possible that control based on the position information added to the communication data can be performed by an application that receives the communication data. In this case, the foregoing application is allowed to be present together with an application having a function of providing a service according to position information, and this makes it possible to improve the convenience in providing services via networks. For an application not having a function for changing processing contents according to position information, communication conditions may be set in an AP by using the present invention. By so doing, a processing operation according to position information can be performed without changing the application. On the other hand, in the case of an application having a function of changing processing contents according to position information, it is not necessary to set communication conditions in an AP. By obtaining position information added to communication data at an AP, execution of an application according to position information is enabled even if a wireless terminal or the like does not have a function of obtaining position information. Alternatively, these may be combined so that a service is provided.

As described above, with the AP 2a according to the present embodiment, when the distance between the wireless terminal 3a as the transmission source and the wired terminal 4 as the transmission destination falls in the predetermined distance range represented by the communication condition data, a communication between the wireless terminal 3a and the wired terminal 4 is controlled according to communication conditions represented by the communication condition data. This makes it possible to control a communication between the wireless terminal 3a and the wired terminal 4 according to the position information of the wireless terminal 3a and the position information of the wired terminal 4, without changing the applications of the wireless terminal 3a and the wired terminal 4.

It should be noted that the specific example shown above is merely a preferred embodiment of the communication system 1 according to the present invention. Various modifications can be made, regarding the control according to the communication conditions represented by communication condition data stored in the communication condition data storing part 27, the control according to communication condition represented by the communication condition data generated by the communication control part 29, and the like.

(First Exemplary Modification of Communication Processing by Communication Control Part)

As an example, a first exemplary modification of the communication processing by the communication control part 29 in #11 in the processing operation shown in FIG. 6 is described in the following. FIG. 7 shows exemplary communication condition data stored in the communication condition data storing part 27 that the communication control part 29 refers to, in the first exemplary modification. As shown in FIG. 7, the communication condition data storing part 27 in the first exemplary modification stores the communication condition table 271. The communication condition table 271 stores communication condition data representing a central position, predetermined distance ranges with respect to the central position, and respective communication bandwidths for the predetermined distance ranges. In the example shown in FIG. 7. the central position "c, d", the distance range "0 to 5 m", and the communication bandwidth "60%" are stored in the first row R1 of the communication condition table 271. In the second row R2 thereof, the central position "c, d", the distance range "5 to 10 m", and the communication bandwidth "30%" are stored. In the third row R3, the central position "c, d", the distance range "10 to 20 m", and the communication bandwidth "10%" are stored. In other words, the communication condition table 271 in FIG. 7 represents that: in the case where the wired terminal 4 is assumed to be the central position and the distance between the wireless terminal 3a and the wired terminal 4 is in the range of 0 to 5 m, 60% of the communication bandwidth is allocated to a communication between the wireless terminal 3a and the wired terminal 4; in the case where the distance between the wireless terminal 3a and the wired terminal 4 is in the range of 5 to 10 m, 30% of the communication bandwidth is allocated to a communication between the wireless terminal 3a and the wired terminal 4; and in the case where the distance between the wireless terminal 3a and the wired terminal 4 is in the range of 10 to 20 m, 10% of the communication bandwidth is allocated to a communication between the wireless terminal 3a and the wired terminal 4.

The distance determining part 28 determines whether or not the distance between the wireless terminal 3a and the wired terminal 4 calculated by the terminal-to-terminal distance calculating part 25 falls in the distance range represented by the communication condition data stored in the communication condition table 271. More specifically, the distance determining part 28 determines which distance range corresponds to the distance "a-c, b-d" between the wireless terminal 3a and the wired terminal 4, among the distance ranges "0 to 5 m", "5 to 10 m", and "10 to 20 m" represented by the communication condition data stored in the communication condition table 271. In the case where none of the foregoing distance ranges corresponds to the foregoing distance, at #9 in the processing operation shown in FIG. 6, the communication control part 29 abandons the communication data received from the wireless terminal 3a, and the wired/wireless LAN interface part 20 transmits notification data to the wireless terminal 3a as the transmission source.

When the distance determining part 28 determines that the distance falls in one of the foregoing distance ranges, the communication control part 29 allocates a communication bandwidth represented by the communication condition data stored in the communication condition table 271 to the communication between the wireless terminal 3a and the wired terminal 4. For example, when the distance determining part 28 determines that the distance between the wireless terminal 3a and the wired terminal 4, i.e., "a-c, b-d", falls in the distance range of "0 to 5 m" represented by the communication condition data, the communication control part 29 allocates 60% of the communication bandwidth to the communication between the wireless terminal 3a and the wired terminal 4. Thus, the communication bandwidth can be allocated according to the distance between the wireless terminal 3a and the wired terminal 4.

(Second Exemplary Modification of Communication Processing Operation by Communication Control Part)

As another example, a second exemplary modification of the communication processing by the communication control part 29 in #11 in the processing operation shown in FIG. 6 is described in the following. FIG. 8 shows exemplary communication condition data stored in the communication condition data storing part 27 that the communication control part 29 refers to, in the second exemplary modification. As shown in FIG. 8, the communication condition data storing part 27 in the second exemplary modification stores the communication condition table 272. The communication condition table 272 stores communication condition data representing a central position, predetermined distance ranges with respect to the central position, and respective priority degrees for the predetermined distance ranges. In the example shown in FIG. 8, the central position "c, d", the distance range "0 to 5 m", and the priority degree "1" are stored in the first row R1 of the communication condition table 272. In the second row R2 thereof, the central position "c, d", the distance range "5 to 10 m", and the priority degree "2" are stored. In the third row R3, the central position "c, d", the distance range "10 to 20 m", and the priority degree "3" are stored. In other words, the communication condition table 272 in FIG. 8 represents that: in the case where the wired wireless terminal 4 is assumed to be the central position and the distance between the wireless terminal 3*a* and the wired terminal 4 is in the range of 0 to 5 m, a communication between the wireless terminal 3*a* and the wired terminal 4 is relayed by priority with respect to a communication between a wireless terminal 3*a* and a wired terminal 4 with a distance therebetween in the range of "5 to 10 m" or "10 to 20 m". In the case where the distance between the wireless terminal 3*a* and the wired terminal 4 is in the range of 5 to 10 m, a communication between the wireless terminal 3*a* and the wired terminal 4 is relayed by priority with respect to a communication between a wireless terminal 3*a* and a wired terminal 4 with a distance therebetween in the range of "10 to 20 m". Further, in the case where the distance between the wireless terminal 3*a* and the wired terminal 4 is in the range of 10 to 20 m, a communication between the wireless terminal 3*a* and the wired terminal 4 has the lowest priority degree as compared with the other communications.

The distance determining part 28 determines whether or not the distance between the wireless terminal 3*a* and the wired terminal 4 calculated by the terminal-to-terminal distance calculating part 25 falls in the distance range represented by the communication condition data stored in the communication condition table 272. More specifically, the distance determining part 28 determines which distance range corresponds to the distance "a-c, b-d" between the wireless terminal 3*a* and the wired terminal 4, among the distance ranges "0 to 5 m", "5 to 10 m", and "10 to 20 m" represented by the communication condition data stored in the communication condition table 272. In the case where none of the foregoing distance ranges corresponds to the foregoing distance, at #9 in the processing operation shown in FIG. 6, the communication control part 29 abandons the communication data received from the wireless terminal 3*a*, and the wired/wireless LAN interface part 20 transmits notification data to the wireless terminal 3*a* as the transmission source.

A communication between a wireless terminal 3*a* and a wired terminal 4 positioned in a distance range with a higher priority degree is relayed by the communication control part 29 by priority with respect to a communication between a wireless terminal 3*a* and a wired terminal 4 positioned in a distance range with a lower priority degree. For example, when the distance determining part 28 determines that the distance "a-c, b-d" between the wireless terminal 3*a* and the wired terminal 4 falls in the distance range "0 to 5 m" represented by the communication condition data, the communication control part 29 relays a communication between the wireless terminal 3*a* and the wired terminal 4 by priority with respect to a communication between a wireless terminal 3*a* and a wired terminal 4 with a distance in the range of "5 to 10 m" or "10 to 20 m". With this, according to a distance between a wireless terminal 3*a* and a wired terminal 4, a communication between a wireless terminal 3*a* and a wired terminal 4 positioned in a distance range with a higher priority degree can be relayed by priority.

Embodiment 2

As Embodiment 1, an example is described in which it is determined whether or not the distance between a wireless terminal and a terminal on the other end falls in a distance range represented by communication condition data so that a communication between the wireless terminal and the terminal on the other end is controlled. In contrast, as Embodiment 2, an example is described in which it is determined whether or not a distance between a wireless terminal and a reference position falls in a distance range represented by communication condition data so that a communication between the wireless terminal and a terminal on the other end is controlled.

(Configuration of Communication System)

Figure 9:
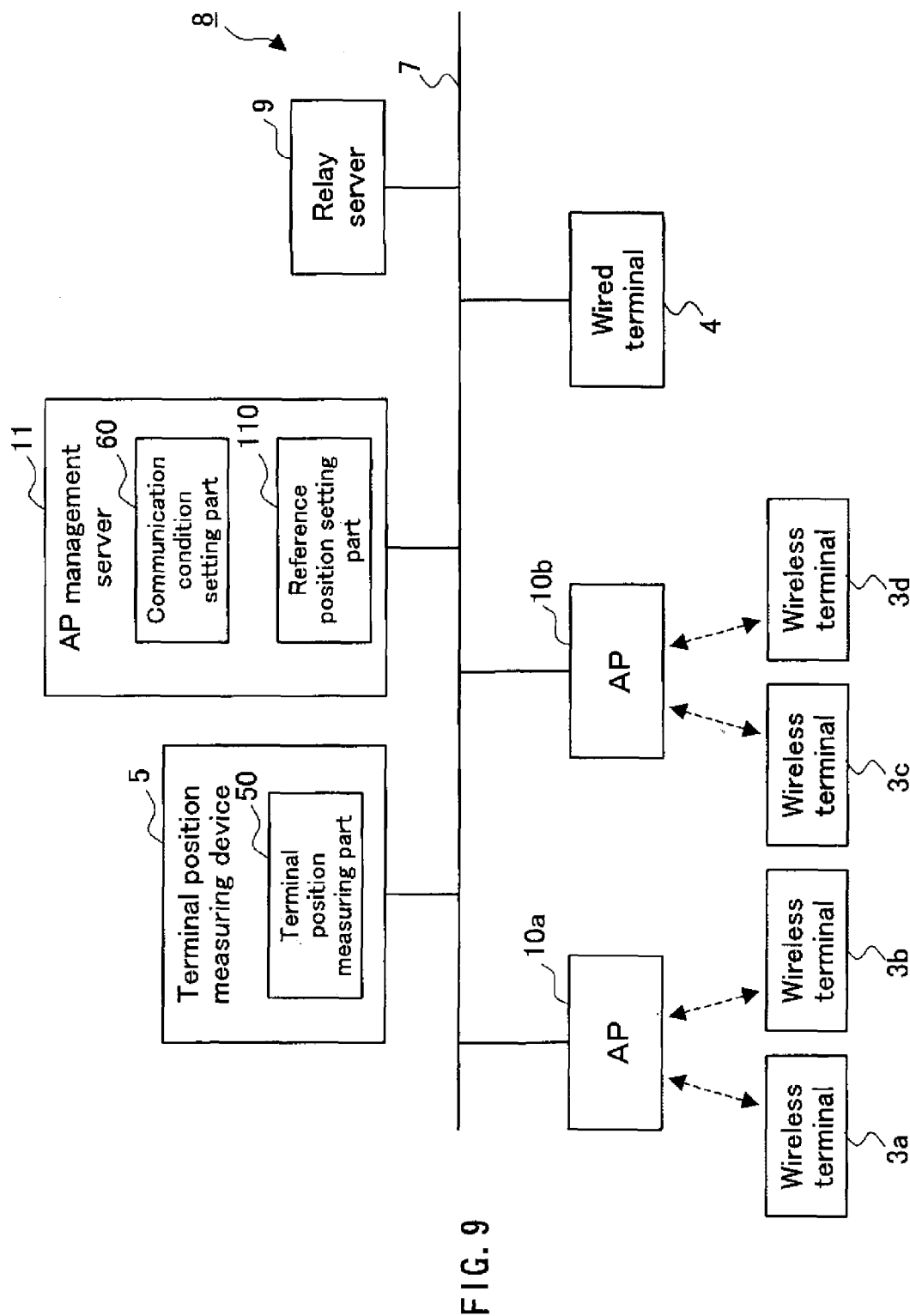
FIG. 9 is a block diagram showing a schematic configuration of a communication system according to Embodiment 2 of the present invention.

FIG. 9 is a block diagram illustrating a schematic configuration of the communication system 8 according to the present embodiment. In FIG. 9, components having the same functions as those shown in FIG. 1 are designated by the same reference numerals, and detailed descriptions of the same are omitted.

More specifically, the communication system 8 according to the same embodiment further includes a relay server 9, in addition to the configuration of the communication system 1 shown in FIG. 1. Further, the AP management server 11 further includes a reference position setting part 110 in addition to the configuration of the AP management server 6 shown in FIG. 1. In place of the AP 2*a* and 2*b* shown in FIG. 1, AP 10*a* and 10*b* are provided.

The AP management server 11 has a function for generating reference position information representing a reference position as a reference with respect to positions of the wireless terminals 3*a* to 3*d*, in addition to the same functions as those of the AP management server 6 shown in FIG. 1. For this purpose, the AP management server 11 includes the reference position setting part 110. The reference position setting part 110 allows a server manager to set the reference position. The AP management server 11 generates reference position information based on the contents set by the reference position setting part 110. The AP management server 11 transmits the generated reference position information to the AP 10*a* or 10*b*.

The relay server (terminal on the other end) 9 is composed of servers such as a web server, an application server, a proxy server. The relay server 9 is composed of one or a plurality of computers such as server machines, personal computers, and work stations. The relay server 9 has a function of transmitting communication data of the wireless terminal 3 received from the AP 10*a* or 10*b* to the wired terminal 4 or the like by using a common gateway interface (CGI) or a java servlet.

(Configuration of AP)

Figure 10:
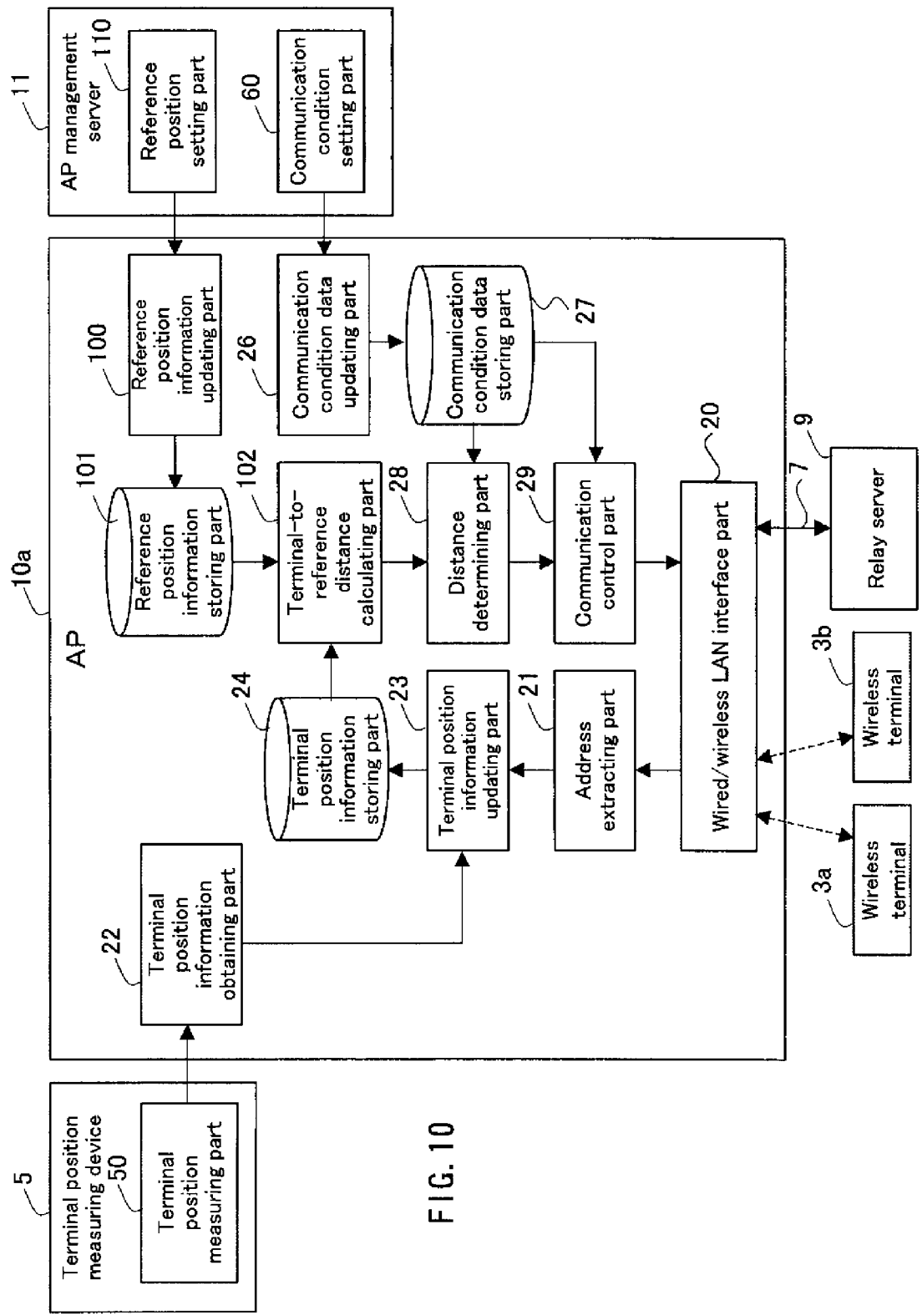
FIG. 10 is a block diagram showing-a schematic configuration of an AP in the communication system.

FIG. 10 is a block diagram illustrating a detailed configuration of the AP 10*a*. The AP 10*b* has the same configuration as that of the AP 10*a* shown FIG. 10. The AP 10*a* shown in FIG. 10 further includes a reference position information updating part 100 and a reference position information storing part 101, in addition to the configuration of AP 2*a* shown in FIG. 2. The AP 10*a* shown in FIG. 10 includes a terminal-to-reference distance calculating part 102, in place of the terminal-to-terminal distance calculating part 25 shown in FIG. 2.

The present embodiment is described by referring to an example in which the AP 10*a* relays a communication between the wireless terminal 3*a* positioned in a conference room in a company and the relay server (terminal on the other end) 9, and receives, from the wireless terminal 3*a*, communication data destined to the relay server 9.

The reference position information updating part 100 updates the reference position information stored in the reference position information storing part 101 to the reference position information received from the AP management server 11. In the case where no reference position information is stored in the reference position information storing part 101, the reference position information updating part 100 newly writes the reference position information received from the AP management server 11 in the reference position information storing part 101.

Figure 11:
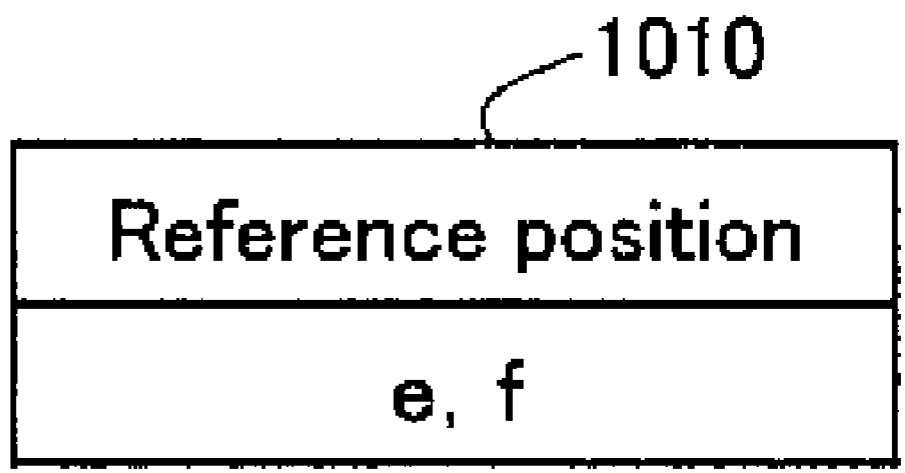
FIG. 11 shows an exemplary data structure of a reference position information storing part in the AP.

The reference position information storing part 101 stores reference position information representing a reference position as a reference with respect to the position of the wireless terminal 3*a*. The reference position information storing part 101 stores the reference position information, for example, as a reference position information table 1010 as shown in FIG. 11. The reference position information table 1010 stores a reference position. In the example shown in FIG. 11, a reference position "e, f" is stored in the reference position information table 1010. In the present embodiment, the center of the conference room is stored as the reference position "e, f". It should be noted that the reference position information storing part 101 may store a plurality of reference positions.

The terminal-to-reference distance calculating part 102 calculates a distance between the wireless terminal 3*a* and the reference position according to the position information of the wireless terminal 3*a* stored in the terminal position information storing part 24 and the reference position information stored in the reference position information storing part 101. More specifically, the terminal-to-reference distance calculating part 102 reads the position information "a, b" of the wireless terminal 3*a* from the terminal position information storing part 24, according to the IP address "10.254.212.195" of the wireless terminal 3*a*. The terminal-to-reference distance calculating part 102 reads the reference position information "e, f" from the reference position information storing part 101. The terminal-to-reference distance calculating part 102 calculates a distance between the wireless terminal 3*a* and the reference position according to the position information "a, b" of the wireless terminal 3*a* and the reference position information "e, f". For example, "a-e, b-f" is calculated as the distance between the wireless terminal 3*a* and the reference position.

The terminal-to-reference distance calculating part 102 calculates a distance between the wireless terminal 3*a* and the reference position based on the position information of the wireless terminal 3*a* and the reference position information. Therefore, in the present embodiment, the address extracting part 21 has to extract only the IP address of the wireless terminal 3*a* as a transmission source, and does not have to extract an IP address of the relay server 9 as a transmission destination Further, the terminal position information obtaining part 22 has to obtain only the position information of the wireless terminal 3*a* as a transmission source, and does not have to obtain the position information of the relay server 9 as a transmission destination. Still further, the terminal position information storing part 24 has to store only the position information of the wireless terminal 3*a* as a transmission source, and does not have to store the position information of the relay server 9 as a transmission destination.

The communication condition data storing part 27 stores the communication condition data representing a central position, a predetermined distance range from the central position, and communication conditions in the predetermined distance range. In the present embodiment, the reference position "e, f" is assumed to be the central position "e, f", and a distance range (area) covering the conference room entirely is stored therein as the predetermined distance range from the central position.

The distance determining part 28 determines whether or not the distance between the wireless terminal 3*a* and the reference position calculated by the terminal-to-reference distance calculating part 102 falls in the distance range represented by the communication condition data stored in the communication condition data storing part 27. In other words, in the present embodiment, it is determined whether or not the wireless terminal 3*a* is positioned in the conference room.

When the distance determining part 28 determines that the distance falls in the foregoing distance range, the communication control part 29 controls the communication between the wireless terminal 3*a* and the relay server 9 according to the communication conditions represented by the communication condition data stored in the communication condition data storing part 27.

In the present embodiment, as an example, the AP 10*a* transmits communication data received from the wireless terminal 3*a* to the relay server 9 in the case where the wireless terminal 3*a* is positioned in the conference room, and the AP 10*a* abandons communication data received from the wireless terminal 3*a* in the case where the wireless terminal 3*a* is positioned out of the conference room. As another example, depending on whether the wireless terminal 3*a* is positioned inside or outside the conference room, the AP 10*a* allocates a different communication bandwidth to a communication between the wireless terminal 3*a* and the relay server 9. For example, in the case where the wireless terminal 3*a* is positioned inside the conference room, a greater communication bandwidth is allocated to the communication, whereas in the case where the wireless terminal 3*a* is positioned outside the conference room, a smaller communication bandwidth is allocated. Still further, as still another example, a communication between the wireless terminal 3*a* positioned in the conference room and the relay server 9 is relayed by priority with respect to a communication between a wireless terminal 3 positioned out of the conference room and the relay server 9.

As still another example, respective reference positions of a plurality of conference rooms may be stored in the reference position information storing part 101, and a communication bandwidth allocated to a communication between the wireless terminal 3*a* and the relay server 9 may be varied depending on which conference room the communication is generated from. Alternatively, for the communication between the wireless terminal 3*a* and the relay server 9, priority degrees may be set for the conference rooms, respectively. With this, it is possible to allocate a greater communication bandwidth, or set a higher priority degree, in the case where, for example, the wireless terminal 3*a* is positioned in a conference room in which an important meeting such as a meeting of a board of directors is held. On the other hand, in contrast, it is possible to allocate a smaller communication bandwidth, or set a lower priority degree, in the case where the wireless terminal 3a is positioned in a conference room in which a less important meeting, such as an intercommunication meeting is held.

It should be noted that the AP 10a described above can be implemented, alternatively, by installing a program in a certain computer such as a personal computer. In other words, the foregoing reference position information updating part 100 and the terminal-to-reference distance calculating part 102 are implemented by a CPU of a computer that operates according to a program that implements the functions of these. Therefore, a program for implementing functions of the reference position information updating part 100 and the terminal-to-reference distance calculating part 102, as well as a recording medium that records the foregoing program are also embodiments of the present invention. Further, the reference position information storing part 101 is implemented by a storage device installed in a computer, or a storage device accessible from this computer.

(Exemplary Operation of Communication System)

Figure 12:
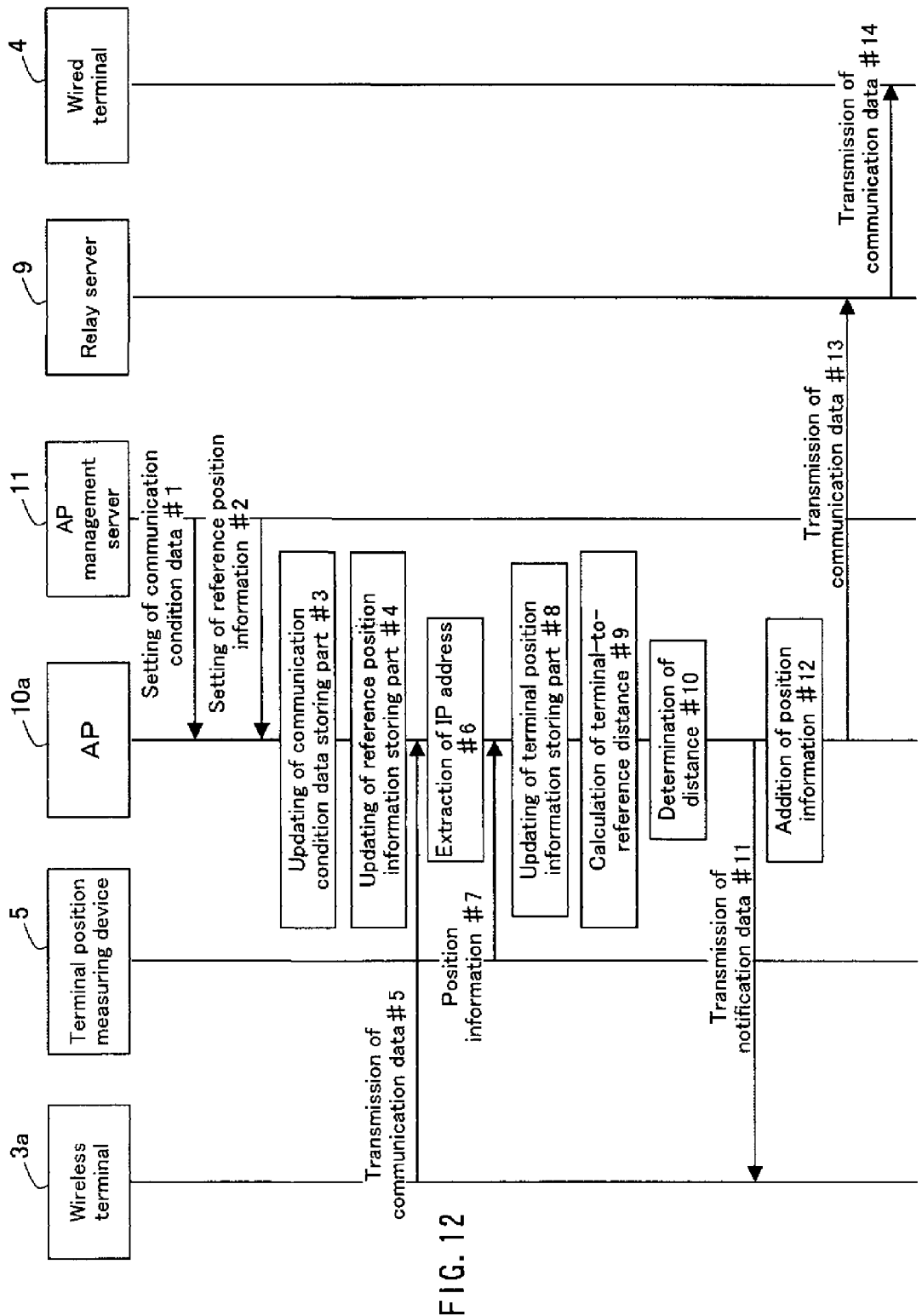
FIG. 12 is a sequence diagram showing an exemplary operation of the communication system.

An operation of the communication system 8 in the above-described configuration will be generally described with reference to FIG. 12. FIG. 12 is a sequence diagram showing an exemplary operation of the communication system 8 in the case where a communication by the wireless terminal 3a shown in FIG. 9 is performed.

The communication condition setting part 60 of the AP management server 11 allows a server manager to set a central position, a predetermined distance range, and communication conditions in the predetermined distance range. The AP management server 11 generates the communication condition data based on the contents set by the communication condition setting part 60. The AP management server 11 transmits the generated communication condition data to the AP 10a (#1). The reference position setting part 110 of the AP management server 11 allows the server manager to set a reference position. The AP management server 11 generates reference position information based on the contents set by the reference position setting part 110. The AP management server 11 transmits the generated reference position information to the AP 10a (#2).

The communication condition data updating part 26 of the AP 10a updates the communication condition data stored in the communication condition data storing part 27 of the AP 10a to the communication condition data received from the AP management server 11 (#3). The reference position information updating part 100 of the AP 10a updates the reference position information stored in the reference position information storing part 101 of the AP 10a to the reference position information received from the AP management server 11 (#4).

Thereafter, when the wireless terminal 3a is activated in the communication area of the AP 10a, the wireless terminal 3a transmits a search message for looking for an AP. The AP 10a responds to the search message, and this causes the wireless terminal 3a to recognize the AP 10a as an accessible AP. The wireless terminal 3a transmits, to the AP 10a, the IP address of the wireless terminal 3a as the transmission source, the IP address of the relay apparatus 9 as the transmission destination, and communication data that represent contents to be transmitted (#5). When the wired/wireless LAN interface part 20 of the AP 10a receives the communication data, the address extracting part 21 of the AP 10a extracts the IP address of the wireless terminal 3a as the transmission source from the communication data (#6).

The terminal position information obtaining part 22 of the AP 10a obtains the position information of the wireless terminal 3a from the terminal position measuring part 50 of the terminal position measuring device 5 (#7). When the position information of the wireless terminal 3a is obtained, the terminal position information updating part 23 of the AP 10a updates the position information of the wireless terminal 3a stored in the terminal position information storing part 24 (#8). More specifically, the terminal position information updating part 23 updates the position information of the wireless terminal 3a stored in the terminal position information storing part 24, to the position information of the wireless terminal 3a obtained by the terminal position information obtaining part 22, based on the IP address of the wireless terminal 3a extracted by the address extracting part 21.

Then, the terminal-to-reference distance calculating part 102 of the AP 10a calculates a distance between the wireless terminal 3a and the reference position based on the position information of the wireless terminal 3a stored in the terminal position information storing part 24 and the reference position information stored in the reference position information storing part 101 (#9). The distance determining part 28 of the AP 10a determines whether or not the distance between the wireless terminal 3a and the reference position calculated by the terminal-to-reference distance calculating part 102 falls in the distance range represented by the communication condition data stored in the communication condition data storing part 27 (#10)

When the distance determining part 28 determines that the distance is out of the foregoing distance range, the communication control part 29 of the AP 10a abandons the communication data received from the wireless terminal 3a. When abandoning the communication data received from the wireless terminal 3a, the communication control part 29 generates notification data representing a transmission error. The wired/wireless LAN interface part 20 transmits the notification data generated by the communication control part 29 to the wireless terminal 3a as the transmission source (#11).

When the distance determining part 28 determines that the foregoing distance falls in the foregoing distance range, the communication control part 29 adds position information of the wireless terminal 3a stored in the terminal position information storing part 24 to the communication data received from the wireless terminal 3a (#12). The wired/wireless LAN interface part 20 of the AP 10a transmits, to the relay server 9, the communication data to which the position information of the wireless terminal 3a has been added (#13). The relay server 9 transmits the communication data received from the AP 10a to the wired terminal 4 or the like by using a CGI or a java servlet (#14).

As described above, with the AP 10a according to the present embodiment, when the distance between the wireless terminal 3a as the transmission source and the reference position falls in the predetermined distance range represented by the communication condition data, a communication between the wireless terminal 3a and the relay server 9 is controlled according to communication conditions represented by the communication condition data. This makes it possible to control a communication between the wireless terminal 3a and the relay server 9 according to the position information of the wireless terminal 3a, without changing the applications of the wireless terminal 3a and the relay server 9.

It should be noted that a configuration and an operation of an AP for a wireless LAN is described as an example in Embodiments 1 and 2. The wireless LAN is in conformity with a specification of a short distance wireless network determined by IEEE 802.11. However, the relay apparatus of the present invention is not limited to an AP for a wireless LAN. For example, the relay apparatus of the present invention can also be applied to the AP for a wireless metropolitan area network (MAN) that is a specification of a long distance wireless network determined by the worldwide interoperability for microwave access (WiMAX).

Besides, an example in which a terminal position measuring device and an AP are configured as separate devices is described as an example in Embodiments 1 and 2, but the present invention is not limited to this example. For example, the terminal position measuring device may be configured to be integrated with the AP.

As described above, the present invention is useful as a relay apparatus that is capable of controlling a communication between a wireless terminal and a terminal on the other end according to a position of the wireless terminal without changing applications of the wireless terminal and the terminal on the other end, as a relay method for the same, and as a recording medium storing a relay program for the same.

The invention may be embodied in other forms without departing from the spirit or essential characteristics thereof. The embodiments disclosed in this application are to be considered in all respects as illustrative and not limiting. The scope of the invention is represented by the appended claims rather than by the foregoing description, and all changes which come within the meaning and range of equivalency of the claims are intended to be embraced therein.

What is claimed is:

1. A relay apparatus for relaying a communication between a wireless terminal and a terminal on the other end, comprising:
    a wireless interface part that receives, from the wireless terminal, communication data including identification information of the wireless terminal as a transmission source, identification information of the terminal on the other end as a transmission destination, and contents to be transmitted;
    an identification information extracting part that extracts identification information of the wireless terminal and the identification information of the terminal on the other end from the received communication data;
    a terminal position information obtaining part that obtains position information of the wireless terminal and position information of the terminal on the other end from a terminal position measuring device that measures positions of the wireless terminal and the terminal on the other end;
    a terminal position information storing part that stores the identification information and the position information of the wireless terminal in an associated state, and stores the identification information and the position information of the terminal on the other end in an associated state;
    a terminal position information updating part that updates the position information of the wireless terminal and the position information of the terminal on the other end stored in the terminal position information storing part, to the position information of the wireless terminal and the position information of the terminal on the other end obtained by the terminal position information obtaining part, based on the identification information of the wireless terminal and the identification information of the terminal on the other end extracted by the identification information extracting part;
    a terminal-to-terminal distance calculating part that calculates a distance between the wireless terminal and the terminal on the other end based on the position information of the wireless terminal and the position information of the terminal on the other end stored in the terminal position information storing part;
    a communication condition data storing part that stores communication condition data representing a predetermined distance range and communication conditions for the predetermined distance range;
    a distance determining part that determines whether or not the distance between the wireless terminal and the terminal on the other end calculated by the terminal-to-terminal distance calculating part falls in the predetermined distance range represented by the communication condition data stored in the communication condition data storing part; and
    a communication control part that controls the communication between the wireless terminal and the terminal on the other end according to the communication conditions represented by the communication condition data stored in the communication condition data storing part, when the distance determining part determines that the calculated distance falls in the predetermined distance range,
    wherein the communication condition data storing part stores communication condition data representing predetermined distance ranges set at a plurality of levels, and priority degrees for the predetermined distance ranges, and
    the communication control part relays communications in a manner such that a communication between the wireless terminal and the terminal on the other end, in which a distance between the wireless terminal and the terminal on the other end falls in the predetermined distance range with a higher priority degree represented by communication condition data stored in the communication condition data storing part, is relayed by priority with respect to a communication between a wireless terminal and a terminal on the other end, in which a distance between the wireless terminal and the terminal on the other end falls in the predetermined distance range with a lower priority degree represented by communication condition data stored in the communication condition data storing part.

2. The relay apparatus according to claim 1, wherein
when the distance determining part determines that the calculated distance falls in the predetermined distance range, the communication control part transmits the communication data received from the wireless terminal to the terminal on the other end, and
when the distance determining part determines that the calculated distance is out of the predetermined distance range, the communication control part abandons the communication data received from the wireless terminal.

3. The relay apparatus according to claim 2, wherein
when the communication control part abandons the communication data received from the wireless terminal, the communication control part generates notification data representing a transmission error, and transmits the generated notification data to the wireless terminal.

4. The relay apparatus according to claim 1, wherein
the communication condition data storing part stores communication condition data representing the predetermined distance range, and a communication bandwidth for the predetermined distance range, and
when the distance determining part determines the calculated distance falls in the predetermined distance range, the communication control part allocates a communication bandwidth represented by the communication condition data stored in the communication condition data storing part to the communication between the wireless terminal and the terminal on the other end.

5. The relay apparatus according to claim 1, wherein when the distance determining part determines that the calculated distance falls in the predetermined distance range, the communication control part adds position information of the wireless terminal stored in the terminal position information storing part to the communication data received from the wireless terminal.

6. A relay apparatus for relaying a communication between a wireless terminal and a terminal on the other end, comprising:
   a wireless interface part that receives, from the wireless terminal, communication data including identification information of the terminal on the other end as a transmission destination, and contents to be transmitted;
   an identification information extracting part that extracts identification information of the wireless terminal from the received communication data;
   a terminal position information obtaining part that obtains position information of the wireless terminal from a terminal position measuring device that measures a position of the wireless terminal;
   a terminal position information storing part stores the identification information and the position information of the wireless terminal in an associated state;
   a terminal position information updating part that updates the position information of the wireless terminal stored in the terminal position information storing part to the position information of the wireless terminal obtained by the terminal position information obtaining part, based on the identification information of the wireless terminal extracted by the identification information extracting part;
   a reference position information storing part that stores reference position information representing a reference position as a reference with respect to the position of the wireless terminal;
   a terminal-to-reference distance calculating part that calculates a distance between the wireless terminal and the reference position based on the position information of the wireless terminal stored in the terminal position information storing part and the reference position information stored in the reference position information storing part;
   a communication condition data storing part that stores communication condition data representing a predetermined distance range and communication conditions for the predetermined distance range;
   a distance determining part that determines whether or not the distance between the wireless terminal and the reference position calculated by the terminal-to-reference-position distance calculating part falls in the predetermined distance range represented by the communication condition data stored in the communication condition data storing part; and
   a communication control part that controls the communication between the wireless terminal and the terminal on the other end according to the communication conditions represented by the communication condition data stored in the communication condition data storing part, when the distance determining part determines that the calculated distance falls in the predetermined distance range,
   wherein the communication condition data storing part stores communication condition data representing predetermined distance ranges set at a plurality of levels, and priority degrees for the predetermined distance ranges, and
   the communication control part relays communications in a manner such that a communication between the wireless terminal and the terminal on the other end, in which a distance between the wireless terminal and the terminal on the other end falls in the predetermined distance range with a higher priority degree represented by communication condition data stored in the communication condition data storing part, is relayed by priority with respect to a communication between a wireless terminal and a terminal on the other end, in which a distance between the wireless terminal and the terminal on the other end falls in the predetermined distance range with a lower priority degree represented by communication condition data stored in the communication condition data storing part.

7. The relay apparatus according to claim 6, wherein when the distance determining part determines that the calculated distance falls in the predetermined distance range, the communication control part transmits the communication data received from the wireless terminal to the terminal on the other end, and
   when the distance determining part determines that the calculated distance is out of the predetermined distance range, the communication control part abandons the communication data received from the wireless terminal.

8. The relay apparatus according to claim 7, wherein when the communication control part abandons the communication data received from the wireless terminal, the communication control part generates notification data representing a transmission error, and transmits the generated notification data to the wireless terminal.

9. The relay apparatus according to claim 6, wherein the communication condition data storing part stores communication condition data representing the predetermined distance range, and a communication bandwidth for the predetermined distance range, and
   when the distance determining part determines the calculated distance falls in the predetermined distance range, the communication control part allocates a communication bandwidth represented by the communication condition data stored in the communication condition data storing part to the communication between the wireless terminal and the terminal on the other end.

10. The relay apparatus according to claim 6, wherein when the distance determining part determines that the calculated distance falls in the predetermined distance range, the communication control part adds position information of the wireless terminal stored in the terminal position information storing part to the communication data received from the wireless terminal.

11. A relay method for relaying a communication between a wireless terminal and a terminal on the other end, the method being performed by a relay apparatus that includes:
   a terminal position information storing part that stores identification information and position information of the wireless terminal in an associated state and stores identification information and position information of the terminal on the other end in an associated state; and
   a communication condition data storing part that stores communication condition data representing a predetermined distance range and communication conditions for the predetermined distance range, the method comprising:

an operation of receiving, from the wireless terminal, communication data including identification information of the wireless terminal as a transmission source, identification information of the terminal on the other end as a transmission destination, and contents to be transmitted;

an identification information extracting operation of extracting the identification information of the wireless terminal and the identification information of the terminal on the other end from the received communication data;

a terminal position information obtaining operation of obtaining position information of the wireless terminal and position information of the terminal on the other end from a terminal position measuring device that measures positions of the wireless terminal and the terminal on the other end;

a terminal position information updating operation of updating the position information of the wireless terminal and the position information of the terminal on the other end stored in the terminal position information storing part, to the position information of the wireless terminal and the position information of the terminal on the other end obtained in the terminal position information obtaining operation, based on the identification information of the wireless terminal and the identification information of the terminal on the other end extracted in the identification information extracting operation;

a terminal-to-terminal distance calculating operation of calculating a distance between the wireless terminal and the terminal on the other end based on the position information of the wireless terminal and the position information of the terminal on the other end stored in the terminal position information storing part;

a distance determining operation of determining whether or not the distance between the wireless terminal and the terminal on the other end calculated in the terminal-to-terminal distance calculating operation falls in the predetermined distance range represented by the communication condition data stored in the communication condition data storing part; and a communication control operation of controlling the communication between the wireless terminal and the terminal on the other end according to the communication conditions represented by the communication condition data stored in the communication condition data storing part, when it is determined in the distance determining operation that the calculated distance falls in the predetermined distance range, wherein the communication condition data storing part stores communication condition data representing predetermined distance ranges set at a plurality of levels, and priority degrees for the predetermined distance ranges, and the communication control operation relays communications in a manner such that a communication between the wireless terminal and the terminal on the other end, in which a distance between the wireless terminal and the terminal on the other end falls in the predetermined distance range with a higher priority degree represented by communication condition data stored in the communication condition data storing part, is relayed by priority with respect to a communication between a wireless terminal and a terminal on the other end, in which a distance between the wireless terminal and the terminal on the other end falls in the predetermined distance range with a lower priority degree represented by communication condition data stored in the communication condition data storing part.

12. A relay method for relaying a communication between a wireless terminal and a terminal on the other end, the method being performed by a relay apparatus that includes:

a terminal position information storing part that stores identification information and position information of the wireless terminal in an associated state;

a reference position information storing part that stores reference position information representing a reference position as a reference with respect to the position of the wireless terminal; and a communication condition data storing part that stores communication condition data representing a predetermined distance range and communication conditions for the predetermined distance range, the method comprising:

an operation of receiving, from the wireless terminal, communication data including identification information of the wireless terminal as a transmission source, identification information of the terminal on the other end as a transmission destination, and contents to be transmitted;

an identification information extracting operation of extracting the identification information of the wireless terminal from the received communication data;

a terminal position information obtaining operation of obtaining position information of the wireless terminal from a terminal position measuring device that measures a position of the wireless terminal;

a terminal position information updating operation of updating the position information of the wireless terminal stored in the terminal position information storing part to the position information of the wireless terminal obtained in the terminal position information obtaining operation, based on the identification information of the wireless terminal extracted in the identification information extracting operation;

a terminal-to-reference distance calculating operation of calculating a distance between the wireless terminal and the reference position based on the position information of the wireless terminal stored in the terminal position information storing part and the reference position information stored in the reference position information storing part;

a distance determining operation of determining whether or not the distance between the wireless terminal and the reference position calculated in the terminal-to-reference distance calculating operation falls in the predetermined distance range represented by the communication condition data stored in the communication condition data storing part; and a communication control operation of controlling the communication between the wireless terminal and the terminal on the other end according to the communication conditions represented by the communication condition data stored in the communication condition data storing part, when it is determined in the distance determining operation that the calculated distance falls in the predetermined distance range, wherein the communication condition data storing part stores communication condition data representing predetermined distance ranges set at a plurality of levels, and priority degrees for the predetermined distance ranges, and the communication control operation relays communications in a manner such that a communication between the wireless terminal and the terminal on the other end, in which a distance between the wireless terminal and the terminal on the other end falls in the predetermined distance range with a higher priority degree represented by communication condition data stored in the communication condition data storing part, is relayed by priority with respect to a communication between a wireless terminal and a terminal on the other end, in which a distance between the wireless terminal and the terminal on the other end falls in the predetermined distance range with a lower priority degree represented by communication condition data stored in the communication condition data storing part.

13. A non-transitory recording medium storing a relay program for causing a computer to execute processing of relaying a communication between a wireless terminal and a terminal on the other end, the computer including:

a terminal position information storing part that stores identification information and position information of the wireless terminal in an associated state and stores identification information and position information of the terminal on the other end in an associated state; and a communication condition data storing part that stores communication condition data representing a predetermined distance range and communication conditions for the predetermined distance range, the relay program causing the computer to execute:

reception processing of receiving, from the wireless terminal, communication data including identification information of the wireless terminal as a transmission source, identification information of the terminal on the other end as a transmission destination, and contents to be transmitted;

identification information extraction processing of extracting the identification information of the wireless terminal and the identification information of the terminal on the other end from the received communication data;

terminal position information obtainment processing of obtaining position information of the wireless terminal and position information of the terminal on the other end from a terminal position measuring device that measures positions of the wireless terminal and the terminal on the other end;

terminal position information updating processing of updating the position information of the wireless terminal and the position information of the terminal on the other end stored in the terminal position information storing part, to the position information of the wireless terminal and the position information of the terminal on the other end obtained in the terminal position information obtainment processing, based on the identification information of the wireless terminal and the identification information of the terminal on the other end extracted in the identification information extraction processing;

terminal-to-terminal distance calculation processing of calculating a distance between the wireless terminal and the terminal on the other end based on the position information of the wireless terminal and the position information of the terminal on the other end stored in the terminal position information storing part;

distance determination processing of determining whether or not the distance between the wireless terminal and the terminal on the other end calculated in the terminal-to-terminal distance calculation processing falls in the predetermined distance range represented by the communication condition data stored in the communication condition data storing part; and communication control processing of controlling the communication between the wireless terminal and the terminal on the other end according to the communication conditions represented by the communication condition data stored in the communication condition data storing part, when it is determined in the distance determination processing that the calculated distance falls in the predetermined distance range, wherein the communication condition data storing part stores communication condition data representing predetermined distance ranges set at a plurality of levels, and priority degrees for the predetermined distance ranges, and the communication control processing relays communications in a manner such that a communication between the wireless terminal and the terminal on the other end, in which a distance between the wireless terminal and the terminal on the other end falls in the predetermined distance range with a higher priority degree represented by communication condition data stored in the communication condition data storing part, is relayed by priority with respect to a communication between a wireless terminal and a terminal on the other end, in which a distance between the wireless terminal and the terminal on the other end falls in the predetermined distance range with a lower priority degree represented by communication condition data stored in the communication condition data storing part.

14. A non-transitory recording medium storing a relay program for causing a computer to execute processing of relaying a communication between a wireless terminal and a terminal on the other end, the computer including:

a terminal position information storing part that stores identification information and position information of the wireless terminal in an associated state;

a reference position information storing part that stores reference position information representing a reference position as a reference with respect to the position of the wireless terminal; and a communication condition data storing part that stores communication condition data representing a predetermined distance range and communication conditions for the predetermined distance range, the relay program causing the computer to execute:

reception processing of receiving, from the wireless terminal, communication data including identification information of the wireless terminal as a transmission source, identification information of the terminal on the other end as a transmission destination, and contents to be transmitted;

identification information extraction processing of extracting the identification information of the wireless terminal from the received communication data;

terminal position information obtainment processing of obtaining position information of the wireless terminal from a terminal position measuring device that measures a position of the wireless terminal;

terminal position information updating processing of updating the position information of the wireless terminal stored in the terminal position information storing part to the position information of the wireless terminal obtained in the terminal position information obtainment processing, based on the identification information of the wireless terminal extracted in the identification information extraction processing;

terminal-to-reference distance calculation processing of calculating a distance between the wireless terminal and the reference position based on the position information of the wireless terminal stored in the terminal position information storing part and the reference position information stored in the reference position information storing part;

distance determination processing of determining whether or not the distance between the wireless terminal and the reference position calculated in the terminal-to-reference distance calculation processing falls in the predetermined distance range represented by the communication condition data stored in the communication condition data storing part; and communication control processing of controlling the communication between the wireless terminal and the terminal on the other end according to the communication conditions represented by the communication condition data stored in the communication condition data storing part, when it is determined in the distance determination processing that the calculated distance falls in the predetermined distance range, wherein the communication condition data storing part stores communication condition data representing predetermined distance ranges set at a plurality of levels, and priority degrees for the predetermined distance ranges, and the communication control processing relays communications in a manner such that a communication between the wireless terminal and the terminal on the other end, in which a distance between the wireless terminal and the terminal on the other end falls in the predetermined distance range with a higher priority degree represented by communication condition data stored in the communication condition data storing part, is relayed by priority with respect to a communication between a wireless terminal and a terminal on the other end, in which a distance between the wireless terminal and the terminal on the other end falls in the predetermined distance range with a lower priority degree represented by communication condition data stored in the communication condition data storing part.

* * * * *